US012332587B2

(12) United States Patent
Haginoya et al.

(10) Patent No.: US 12,332,587 B2
(45) Date of Patent: Jun. 17, 2025

(54) IMAGE FORMATION APPARATUS, IMAGE FORMATION METHOD, AND IMAGE FORMATION PROGRAM

(71) Applicant: Oki Electric Industry Co., Ltd., Tokyo (JP)

(72) Inventors: Michiaki Haginoya, Tokyo (JP); Hiroshi Rokugawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 18/651,692

(22) Filed: May 1, 2024

(65) Prior Publication Data

US 2024/0377773 A1 Nov. 14, 2024

(30) Foreign Application Priority Data

May 12, 2023 (JP) ................................ 2023-079225

(51) Int. Cl.
*G03G 15/16* (2006.01)
*G03G 15/00* (2006.01)

(52) U.S. Cl.
CPC ..... *G03G 15/1675* (2013.01); *G03G 15/5004* (2013.01); *G03G 15/5029* (2013.01); *G03G 2215/00734* (2013.01); *G03G 2215/00738* (2013.01)

(58) Field of Classification Search
None
See application file for complete search history.

(56) References Cited

U.S. PATENT DOCUMENTS 5,530,522 A * 6/1996 Tsunemi ............ G03G 15/1675 399/45
2008/0019715 A1* 1/2008 Furukawa ............ G03G 15/235 399/45
2009/0169230 A1* 7/2009 Deguchi ............ G03G 15/1675 399/66
2010/0239335 A1* 9/2010 Sawai .................. G03G 15/161 399/319
2013/0136468 A1* 5/2013 Shimizu ............ G03G 15/1605 399/314

(Continued)

FOREIGN PATENT DOCUMENTS

JP 2022-52732 A 4/2022

*Primary Examiner* — Sevan A Aydin
(74) *Attorney, Agent, or Firm* — METROLEX IP LAW GROUP, PLLC; Robert L. Scott, Esq.

(57) ABSTRACT

An image formation apparatus may include a voltage supply device configured to control a transfer voltage such that a first ratio of a first transfer voltage to a second transfer voltage, is greater than a second ratio of a third transfer voltage to a fourth transfer voltage, where the first transfer voltage is the transfer voltage for a first medium having a first thickness, a first resistance, and a first width, the second transfer voltage is for a second medium having the first thickness and the first resistance, and a second width larger than the first width, the third transfer voltage is for a third medium having a second thickness larger than the first thickness, a second resistance smaller than the first resistance, and the first width, and the fourth transfer voltage is for a fourth medium having the second thickness, the second resistance, and the second width.

13 Claims, 14 Drawing Sheets

(56) References Cited

U.S. PATENT DOCUMENTS

| | | | | |
|---|---|---|---|---|
| 2015/0023681 | A1* | 1/2015 | Shida | G03G 15/1605 399/66 |
| 2015/0093133 | A1* | 4/2015 | Nakaegawa | G03G 15/0189 399/66 |
| 2015/0277300 | A1* | 10/2015 | Hironaka | G03G 15/1675 399/66 |
| 2017/0185004 | A1* | 6/2017 | Takenaka | G03G 15/162 |
| 2017/0300000 | A1* | 10/2017 | Nakamura | G03G 15/1675 |
| 2020/0050133 | A1* | 2/2020 | Ohta | G03G 15/1605 |
| 2021/0072673 | A1* | 3/2021 | Kakehi | G03G 15/5029 |
| 2022/0197192 | A1* | 6/2022 | Kobayashi | G03G 15/0189 |

* cited by examiner

FIG. 5

TV1

| TEMPERATURE [°C] / HUMIDITY [%] | $H_1$ | $H_2$ | · · · | $H_m$ |
|---|---|---|---|---|
| $T_1$ | $Vtr_{aS\_BK11}$ | $Vtr_{aS\_BK21}$ | · · · | $Vtr_{aS\_BKm1}$ |
| $T_2$ | $Vtr_{aS\_BK12}$ | $Vtr_{aS\_BK22}$ | · · · | $Vtr_{aS\_BKm2}$ |
| · · · | · · · | · · · | · · · | · · · |
| $T_n$ | $Vtr_{aS\_BK1n}$ | $Vtr_{aS\_BK2n}$ | · · · | $Vtr_{aS\_BKmn}$ |

FIG. 6

TV2

| TEMPERATURE [°C] / HUMIDITY [%] | $H_1$ | $H_2$ | · · · | $H_m$ |
|---|---|---|---|---|
| $T_1$ | $Vtr_{bS\_BK11}$ | $Vtr_{bS\_BK21}$ | · · · | $Vtr_{bS\_BKm1}$ |
| $T_2$ | $Vtr_{bS\_BK12}$ | $Vtr_{bS\_BK22}$ | · · · | $Vtr_{bS\_BKm2}$ |
| · · · | · · · | · · · | · · · | · · · |
| $T_n$ | $Vtr_{bS\_BK1n}$ | $Vtr_{bS\_BK2n}$ | · · · | $Vtr_{bS\_BKmn}$ |

FIG. 7

TA11

| TEMPERATURE [°C] / HUMIDITY [%] | $H_1$ | $H_2$ | · · · | $H_m$ |
|---|---|---|---|---|
| $T_1$ | $A_{aS\_BK11}$ | $A_{aS\_BK21}$ | · · · | $A_{aS\_BKm1}$ |
| $T_2$ | $A_{aS\_BK12}$ | $A_{aS\_BK22}$ | · · · | $A_{aS\_BKm2}$ |
| · · · | · · · | · · · | · · · | · · · |
| $T_n$ | $A_{aS\_BK1n}$ | $A_{aS\_BK2n}$ | · · · | $A_{aS\_BKmn}$ |

FIG. 8
TA21
| TEMPERATURE [°C] / HUMIDITY [%] | $H_1$ | $H_2$ | · · · | $H_m$ |
|---|---|---|---|---|
| $T_1$ | $A_{bS\_BK11}$ | $A_{bS\_BK21}$ | · · · | $A_{bS\_BKm1}$ |
| $T_2$ | $A_{bS\_BK12}$ | $A_{bS\_BK22}$ | · · · | $A_{bS\_BKm2}$ |
| · · · | · · · | · · · | · · · | · · · |
| $T_n$ | $A_{bS\_BK1n}$ | $A_{bS\_BK2n}$ | · · · | $A_{bS\_BKmn}$ |
FIG. 9
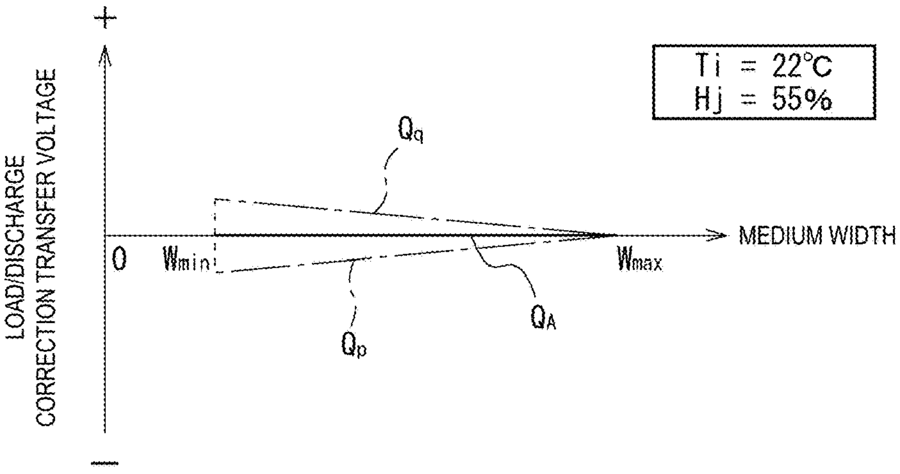
FIG. 10
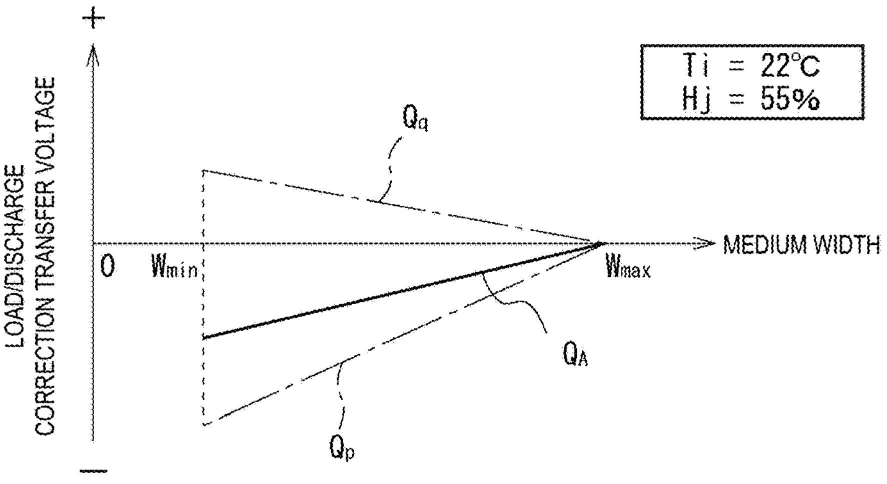

FIG. 11

TA12

| TEMPERATURE [°C] / HUMIDITY [%] | $H_1$ | $H_2$ | · · · | $H_m$ |
|---|---|---|---|---|
| $T_1$ | $A_{aS\_YE11}$ | $A_{aS\_YE21}$ | · · · | $A_{aS\_YEm1}$ |
| $T_2$ | $A_{aS\_YE12}$ | $A_{aS\_YE22}$ | · · · | $A_{aS\_YEm2}$ |
| · · · | · · · | · · · | · · · | · · · |
| $T_n$ | $A_{aS\_YE1n}$ | $A_{aS\_YE2n}$ | · · · | $A_{aS\_YEmn}$ |

FIG. 12

TA13

| TEMPERATURE [°C] / HUMIDITY [%] | $H_1$ | $H_2$ | · · · | $H_m$ |
|---|---|---|---|---|
| $T_1$ | $A_{aS\_MA11}$ | $A_{aS\_MA21}$ | · · · | $A_{aS\_MAm1}$ |
| $T_2$ | $A_{aS\_MA12}$ | $A_{aS\_MA22}$ | · · · | $A_{aS\_MAm2}$ |
| · · · | · · · | · · · | · · · | · · · |
| $T_n$ | $A_{aS\_MA1n}$ | $A_{aS\_MA2n}$ | · · · | $A_{aS\_MAmn}$ |

FIG. 13

TA14

| TEMPERATURE [°C] / HUMIDITY [%] | $H_1$ | $H_2$ | · · · | $H_m$ |
|---|---|---|---|---|
| $T_1$ | $A_{aS\_CY11}$ | $A_{aS\_CY21}$ | · · · | $A_{aS\_CYm1}$ |
| $T_2$ | $A_{aS\_CY12}$ | $A_{aS\_CY22}$ | · · · | $A_{aS\_CYm2}$ |
| · · · | · · · | · · · | · · · | · · · |
| $T_n$ | $A_{aS\_CY1n}$ | $A_{aS\_CY2n}$ | · · · | $A_{aS\_CYmn}$ |

TA31

| TEMPERATURE [°C] / HUMIDITY [%] | $H_1$ | $H_2$ | · · · | $H_m$ |
|---|---|---|---|---|
| $T_1$ | $A_{aD\_BK11}$ | $A_{aD\_BK21}$ | · · · | $A_{aD\_BKm1}$ |
| $T_2$ | $A_{aD\_BK12}$ | $A_{aD\_BK22}$ | · · · | $A_{aD\_BKm2}$ |
| · · · | · · · | · · · | · · · | · · · |
| $T_n$ | $A_{aD\_BK1n}$ | $A_{aD\_BK2n}$ | · · · | $A_{aD\_BKmn}$ |

TA32

| TEMPERATURE [°C] / HUMIDITY [%] | $H_1$ | $H_2$ | · · · | $H_m$ |
|---|---|---|---|---|
| $T_1$ | $A_{aD\_YE11}$ | $A_{aD\_YE21}$ | · · · | $A_{aD\_YEm1}$ |
| $T_2$ | $A_{aD\_YE12}$ | $A_{aD\_YE22}$ | · · · | $A_{aD\_YEm2}$ |
| · · · | · · · | · · · | · · · | · · · |
| $T_n$ | $A_{aD\_YE1n}$ | $A_{aD\_YE2n}$ | · · · | $A_{aD\_YEmn}$ |

TA33

| TEMPERATURE [°C] / HUMIDITY [%] | $H_1$ | $H_2$ | ・・・ | $H_m$ |
|---|---|---|---|---|
| $T_1$ | $A_{aD\_MA11}$ | $A_{aD\_MA21}$ | ・・・ | $A_{aD\_MAm1}$ |
| $T_2$ | $A_{aD\_MA12}$ | $A_{aD\_MA22}$ | ・・・ | $A_{aD\_MAm2}$ |
| ・・・ | ・・・ | ・・・ | ・・・ | ・・・ |
| $T_n$ | $A_{aD\_MA1n}$ | $A_{aD\_MA2n}$ | ・・・ | $A_{aD\_MAmn}$ |

TA34

| TEMPERATURE [°C] / HUMIDITY [%] | $H_1$ | $H_2$ | ・・・ | $H_m$ |
|---|---|---|---|---|
| $T_1$ | $A_{aD\_CY11}$ | $A_{aD\_CY21}$ | ・・・ | $A_{aD\_CYm1}$ |
| $T_2$ | $A_{aD\_CY12}$ | $A_{aD\_CY22}$ | ・・・ | $A_{aD\_CYm2}$ |
| ・・・ | ・・・ | ・・・ | ・・・ | ・・・ |
| $T_n$ | $A_{aD\_CY1n}$ | $A_{aD\_CY2n}$ | ・・・ | $A_{aD\_CYmn}$ |

FIG. 23
TA41
| TEMPERATURE [°C] / HUMIDITY [%] | $H_1$ | $H_2$ | · · · | $H_m$ |
|---|---|---|---|---|
| $T_1$ | $A_{aS\_BK\_SL11}$ | $A_{aS\_BK\_SL21}$ | · · · | $A_{aS\_BK\_SLm1}$ |
| $T_2$ | $A_{aS\_BK\_SL12}$ | $A_{aS\_BK\_SL22}$ | · · · | $A_{aS\_BK\_SLm2}$ |
| · · · | · · · | · · · | · · · | · · · |
| $T_n$ | $A_{aS\_BK\_SL1n}$ | $A_{aS\_BK\_SL2n}$ | · · · | $A_{aS\_BK\_SLmn}$ |
FIG. 24
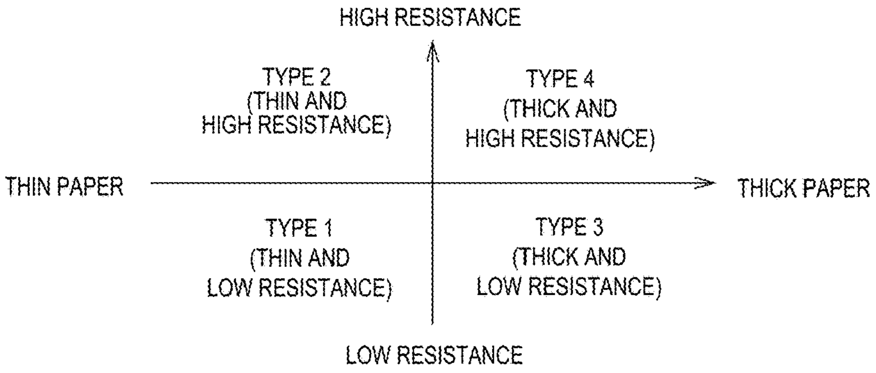
FIG. 25
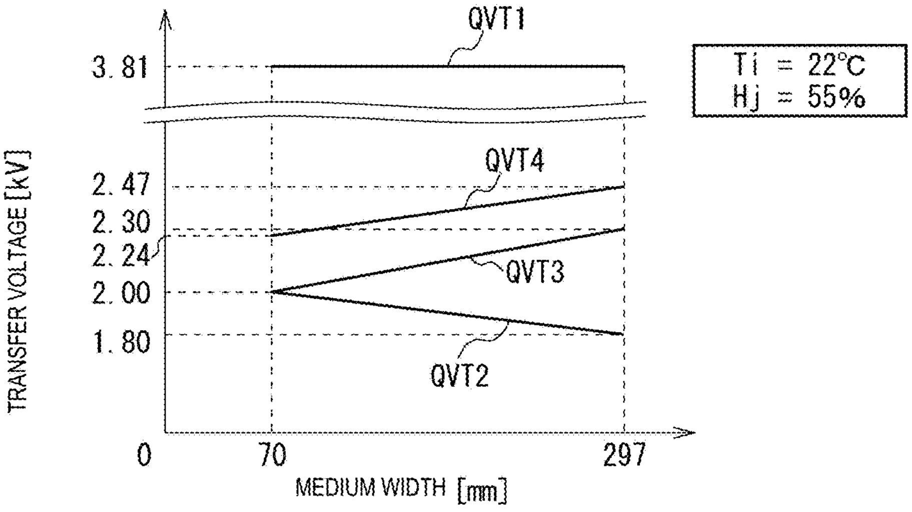

| TYPE | TRANSFER VOLATGE [kV] | | TRANSFER VOLATGE RATIO |
|---|---|---|---|
| | Vtrn | Vtrw | RVtr |
| TYPE 2 | 1. 98 | 1. 86 | 1. 06 (>1) |
| TYPE 3 | 2. 00 | 2. 29 | 0. 87 (<1) |

IMAGE FORMATION APPARATUS, IMAGE FORMATION METHOD, AND IMAGE FORMATION PROGRAM

CROSS REFERENCE TO RELATED APPLICATIONS

This application claims priority based on 35 USC 119 from prior Japanese Patent Application No. 2023-079225 filed on May 12, 2023, entitled "IMAGE FORMATION APPARATUS, IMAGE FORMATION METHOD, AND IMAGE FORMATION PROGRAM," the entire contents of which are incorporated herein by reference.

BACKGROUND

The disclosure may relate to an image formation apparatus, an image formation method, and an image formation program, and may be suitable for application to an electrophotographic image formation apparatus (so-called printer), for example.

In a related art, there has been known an electrophotographic image formation apparatus in which an image formation unit forms a developer image with a developer on a surface of a photosensitive drum (or an image carrier), a transfer portion transfers the developer image from the photosensitive drum to a medium such as paper, and a fixation device fixes the developer image to the medium, thereby printing an image on the medium.

A predetermined high voltage (hereinafter referred to a transfer voltage) is applied to a transfer member (e.g., a transfer roller) with the medium being sandwiched between the transfer member and the image carrier at the transfer portion, so that the developer image is transferred to the medium. At this time, the medium functions as an electrical resistance. However, the resistance value of the medium differs depending on a width (a length along a main scanning direction), a thickness, material, and the like of the medium. Further, in the transfer portion, gaps are formed on outside of the medium in the width direction of the transfer portion, and the image carrier and the transfer member directly contact each other on the widthwise outside of the gaps.

Due to these multiple factors, the current flowing through parts of the transfer portion differs depending on the width, the thickness, and the material of the paper and the like and therefore the appropriate transfer voltage also differs. Accordingly, there has been proposed an image formation apparatus that controls a transfer voltage according to a current flowing through parts of a transfer portion (for example, see Patent Document 1).

Patent Document 1: Japanese Patent Application Publication No. 2022-52732 (see FIG. 12)

SUMMARY

By the way, there has been known an image formation apparatus that runs an endless conveyor belt to convey a medium thereon. The conveyer belt is made of a flexible but relatively hard resin material, from a viewpoint of stably conveying the medium.

In such an image formation apparatus, the medium and the conveyor belt are stacked and sandwiched between the image carrier and the transfer member at the transfer portion. At this time, since the degree of deformation of the conveyor belt at the transfer portion is relatively small, the area in which the image carrier and the conveyor belt are in direct contact becomes narrow or there is no direct contact between the image carrier and the conveyor belt, and therefore a gap is formed between the image carrier and the conveyor belt in a sufficiently large area in the width direction.

As a result, this image formation apparatus is different from that in Patent Document 1 in the behavior of the current flowing through the parts of the transfer portion, which may make it difficult to control the transfer voltage to an appropriate value. Therefore, there may be a problem in that a good image quality cannot be obtained.

An object of one or more embodiment of the disclosure may be to propose an image formation apparatus, an image formation method, and an image formation program that can suppress deterioration of image quality in transfer processing.

A first aspect of an embodiment may be an image formation apparatus that may include: an image carrier configured to carry a developer image; a conveyor belt configured to convey a medium; a transfer member that faces the image carrier with the conveyor belt therebetween and is configured to transfer the developer image from the image carrier to the medium on the conveyor belt; and a voltage supply device configured to supply a transfer voltage to the transfer member, wherein the voltage supply device is configured to control the transfer voltage such that a first voltage ratio, which is a ratio of a first transfer voltage to a second transfer voltage, is greater than a second voltage ratio, which is a ratio of a third transfer voltage to a fourth transfer voltage, where (i) the first transfer voltage is the transfer voltage for a first medium that has a first thickness, a first resistance, and a first width, (ii) the second transfer voltage is the transfer voltage for a second medium that has the first thickness, the first resistance, and a second width larger than the first width, (iii) the third transfer voltage is the transfer voltage for a third medium that has a second thickness larger than the first thickness, a second resistance smaller than the first resistance, and the first width, and (iv) the fourth transfer voltage is the transfer voltage for a fourth medium that has the second thickness, the second resistance, and the second width.

A second aspect of an embodiment may be an image formation method that may include: acquiring information about a medium; supplying a transfer voltage from a voltage supply device to a transfer member facing an image carrier that carries a developer image via a conveyor belt that conveys the medium; and transferring the developer image from the image carrier to the medium by the transfer member supplied with the transfer voltage. The supplying of the transfer voltage from the voltage supply device to the transfer member may comprise: controlling the transfer voltage such that a first voltage ratio, which is a ratio of a first transfer voltage to a second transfer voltage, is greater than a second voltage ratio, which is a ratio of a third transfer voltage to a fourth transfer voltage, where (i) the first transfer voltage is the transfer voltage for a first medium that has a first thickness, a first resistance, and a first width, (ii) the second transfer voltage is the transfer voltage for a second medium that has the first thickness, the first resistance, and a second width larger than the first width, (iii) the third transfer voltage is the transfer voltage for a third medium that has a second thickness larger than the first thickness, a second resistance smaller than the first resistance, and the first width, and (iv) the fourth transfer voltage is the transfer voltage for a fourth medium that has the second thickness, the second resistance, and the second width.

A third aspect of an embodiment may be a non-transitory computer-readable storage medium that stores an image formation program. The program causes a processor to perform operations comprising: acquiring information regarding a medium; supplying a transfer voltage from a voltage supply device to a transfer member facing an image carrier that carries a developer image via a conveyor belt that conveys the medium; and transferring the developer image from the image carrier to the medium by the transfer member supplied with the transfer voltage. The supplying of the transfer voltage from the voltage supply device to the transfer member may comprise: controlling the transfer voltage such that a first voltage ratio, which is a ratio of a first transfer voltage to a second transfer voltage, is greater than a second voltage ratio, which is a ratio of a third transfer voltage to a fourth transfer voltage, where (i) the first transfer voltage is the transfer voltage for a first medium that has a first thickness, a first resistance, and a first width, (ii) the second transfer voltage is the transfer voltage for a second medium that has the first thickness, the first resistance, and a second width larger than the first width, (iii) the third transfer voltage is the transfer voltage for a third medium that has a second thickness larger than the first thickness, a second resistance smaller than the first resistance, and the first width, and (iv) the fourth transfer voltage is the transfer voltage for a fourth medium that has the second thickness, the second resistance, and the second width.

According to at least one of the aspects described above, the transfer voltage is controlled such that the first voltage ratio is greater than the second voltage ratio. Therefore, in both cases of a relatively thin and relatively high resistance medium and a relatively thick and relatively low resistance medium, an appropriate transfer voltage can be supplied to the transfer member, regardless of a size of a gap formed depending on the width and the thickness of the medium, and the like.

Accordingly, it is possible to realize an image formation apparatus, an image formation method, and an image formation program that can suppress deterioration of an image quality in transfer processing.

BRIEF DESCRIPTION OF DRAWINGS

FIG. 5 is a schematic diagram illustrating a voltage table for thin paper;

FIG. 6 is a schematic diagram illustrating a voltage table for thick paper;

FIG. 7 is a schematic diagram illustrating a correction table for the thin paper;

FIG. 8 is a schematic diagram illustrating a correction table for the thick paper;

FIG. 9 is a schematic diagram illustrating a relationship between a medium width (a paper width) and a load/discharge correction transfer voltage for the thin paper;

FIG. 10 is a schematic diagram illustrating a relationship between a medium width and a load/discharge correction transfer voltage for the thick paper;

FIG. 11 is a schematic diagram illustrating a correction table for a transfer portion provided at a second position (a second transfer portion) in a transfer order;

FIG. 12 is a schematic diagram illustrating a correction table for a transfer portion provided at a third position (a third transfer portion) in the transfer order;

FIG. 13 is a schematic diagram illustrating a correction table for a transfer portion provided at a fourth position (a fourth transfer portion) in the transfer order;

FIG. 23 is a schematic diagram illustrating a correction table when the printing speed is low.

FIG. 24 is a schematic diagram illustrating classification of the paper based on a paper thickness and an electrical resistance value of the paper;

FIG. 25 is a schematic diagram illustrating a relationship between the medium width and the transfer voltage for each paper type;

DETAILED DESCRIPTION

Figure 1:
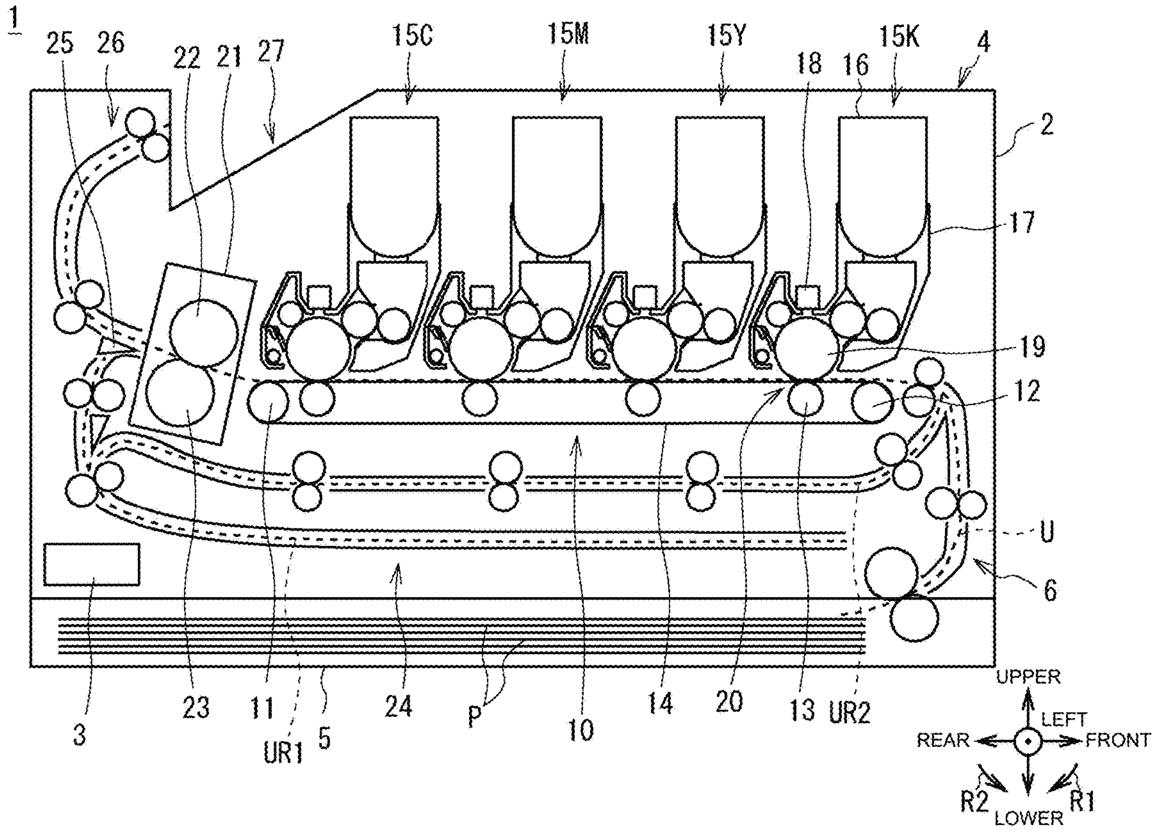
FIG. 1 is a schematic diagram illustrating a configuration of an image formation apparatus.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

[1. Configuration of Image Formation Apparatus]

[1-1. General Configuration]

As illustrated in a schematic cross sectional view of FIG. 1, an image formation apparatus 1 according to a first embodiment is an electrophotographic color printer. The image formation apparatus 1 forms a monochrome or color image on a sheet of paper P as a medium, that is, prints the image on the medium P. Note that the image formation apparatus 1 is a single function printer (SFP) having a printer function, without having an image scanner function to read a document, a communication function using a telephone line, or the like.

The image formation apparatus 1 includes various parts arranged inside a housing 2 (an apparatus housing) substantially formed in a box shape. In the following description, the rightmost portion in FIG. 1 is the front of the image formation apparatus 1, and the vertical direction, the left-right direction, and the front-rear direction are defined as seen facing the front. Further, the left-right direction is also referred to as a main scanning direction or a width direction.

The image formation apparatus 1 is configured as an information processing apparatus, and is entirely controlled by a print controller 3. The print controller 3 includes a CPU (Central Processing Unit), ROM (Read Only Memory), RAM (Random Access Memory) and the like, which are not illustrated in the figures, and executes various processes by executing various programs. The print controller 3 is connected wirelessly or by wire to an external device (not illustrated) such as a computer device or the like. When receiving print data including an image to be printed from the external apparatus, the print controller 3 executes printing process to form a print image on a surface(s) of the paper P.

A display operation part 4 is provided at a front portion of a top surface of the housing 2. The display operation part 4 is configured as a touch panel that is a combination of a liquid crystal panel and a touch sensor, for example. The display operation part 4 displays various information based on the control of the print controller 3, and also receives operation input from the user and notifies the print controller 3 of the received operation input.

A paper cassette 5 or a media cassette is provided at a bottom portion of the housing 2 to accommodate paper P (also referred to as media) in a stacked manner. A paper feeder 6 or a media feeder is provided on an upper front side of the paper cassette 5. The paper feeder 6 includes various rollers, conveyance guides, and the like appropriately arranged along a conveyance path U, which is a path for conveying the paper P from an upper front portion of the paper cassette 5.

Under the control of the print controller 3, the paper feeder 6 (FIG. 1) appropriately rotates the various rollers and the like, to pick up the paper P stored in the paper cassette 5 while separating the paper P one by one. The paper feeder 6 then advances the paper P forwardly upward along the conveyance path U while guiding the paper P by the conveyance guides, and then turns the conveyance direction of the paper P toward the rear direction so as to feed the paper P in the rear direction.

On the rear side of the paper feeder 6, the conveyance path U is formed generally along the front-rear direction. An intermediate conveying section 10 is arranged below the conveyance path U. The intermediate conveying section 10 is composed of a belt drive roller 11 on a rear side thereof, a belt driven roller 12 on a front side thereof, four transfer rollers 13, a transfer belt 14, and the like.

The belt drive roller 11, the belt driven roller 12, and the transfer rollers 13 are all formed in a cylindrical shape with a center axis extending in the left-right direction, and are rotatably supported. The belt drive roller 11 is disposed in the vicinity of the rear end of the intermediate conveying section 10, and is rotated in the direction of arrow R2 by a driving force from a belt motor (not illustrated). The belt driven roller 12 is provided in the vicinity of the front end of the intermediate conveying section 10.

The four transfer rollers 13 are arranged at predetermined intervals in the front-rear direction between the belt drive roller 11 and the belt driven roller 12. Further, a predetermined bias voltage is applied to each of the transfer rollers 13 from a transfer voltage generator 54, which will be described later.

The transfer belt 14 serving as a conveyor belt is made of a resin material that has flexibility and a certain degree of hardness, such as polyimide, and is configured as an endless belt. The transfer belt 14 has a thickness of, for example, 100±8 μm and a circumferential length of 624±1.5 mm. The transfer belt 14 is stretched around the belt drive roller 11 and the belt driven roller 12, and the upper line thereof is positioned along the conveyance path U.

The transfer belt 14 travels so that the upper line of the transfer belt 14 moves in the rear direction as the belt drive roller 11 rotates. When the paper P is conveyed from the paper feeder 6 to the transfer belt 14, the transfer belt 14 conveys the paper P in the rear direction along the conveyance path U with the paper P placed on the upper side thereof. In the intermediate conveying section 10, when the rotation speed of the belt motor described above changes based on the control of the print controller 3 as a speed controller, the traveling speed (the running speed) of the transfer belt 14 also changes.

Above the intermediate conveying section 10, four image formation units 15 (15K, 15Y, 15M, and 15C) are arranged in order from the front side toward the rear side. The image formation units 15 respectively use toner in a black color (K), a yellow color (Y), a magenta color (M), and a cyan color (C), and are different only in colors of the toners (developers) to be used and have the configuration same as each other. Each image formation unit 15 roughly includes a toner cartridge 16, an image drum unit 17 (an ID unit 17), an exposure head 18, and the like.

The toner cartridge 16 is configured to be attachable to and detachable from the image drum unit 17, and stores therein a toner serving as a developer. The toner cartridge 16 include a toner supply port which is formed at a connection portion with the image drum unit 17 and is configured to be opened and closed such that the toner is supplied through the toner supply port to the image drum unit 17.

The image drum unit 17 is configured to be attachable to and detachable from the housing 2, and includes a cylindrical photosensitive drum 19, various rollers, and the like. Each image drum unit 17 includes the photosensitive drum 19 positioned directly above a corresponding one of the transfer rollers 13, and is biased downward by a biasing mechanism (not illustrated). With this configuration of the image formation apparatus 1, the transfer belt 14 is nipped between the photosensitive drums 19 of the image drum units 17 and the respective transfer rollers 13. Hereinafter, a portion where the photosensitive drum 19 and the corresponding transfer roller 13 nips (sandwiches) therebetween the transfer belt 14 or the transfer belt 14 and the paper P is referred to as a transfer portion 20 or a nip portion.

The image drum unit 17 is configured to generate, based on, for example, the print data supplied from the external device (not illustrated), an electrostatic latent image on the circumferential surface of the photosensitive drum 19 of each of the image formation units 15 (15K, 15Y, 15M, and 15C), and develop the electrostatic latent image with the toner supplied from the toner cartridge 16 so as to form a toner image on the circumferential surface of the photosensitive drum 19. When the paper P is conveyed along the conveyance path U to the transfer portions 20 corresponding to the image formation units 15 (15K, 15Y, 15M, and 15C), the toner images on the circumferential surfaces of the photosensitive drums 19 of the image formation units 15 (15K, 15Y, 15M, and 15C) are sequentially transferred to the paper P. For convenience of explanation, the toner may be referred to as a developer and the toner image may be referred to as a developer image.

A fixation device 21 is provided in the vicinity of the rear end of the intermediate conveying section 10. The fixation device 21 includes a heating roller 22 and a pressure roller 23 disposed opposite to each other across the conveyance path U. The heating roller 22 is formed in a cylindrical tubular shape with an axis extending along the left-right direction, and includes a heater (not illustrated) provided inside thereof. The pressure roller 23 is formed in a cylindrical tubular shape same as or similar to the heating roller 22 and makes the upper surface thereof pressed against the lower surface of the heating roller 22 with a predetermined pressing force. The fixation device 21 is also provided with a temperature sensor (not illustrated) for detecting the temperature and the like.

The fixation device 21 is configured, when receiving a driving force from a fixation motor (not illustrated), to heat the heating roller 22 and rotate the heating roller 22 and the pressure roller 23 in respective predetermined directions under the control of the print controller 3. With this, the fixation device 21 applies heat and pressure to the paper P received from the intermediate conveying section 10, i.e., the paper P on which the toner images of the respective colors are sequentially superimposed, so as to fix the toner images to the paper P, and then conveys the paper P in the rear direction.

A paper reversing section 24 is provided on the downstream of and below the fixation device 21. The paper reversing section 24 includes a plurality of conveyance paths such as a retraction path UR1 and a circulation path UR2 using a plurality of conveyance guides, a plurality of conveyance rollers, etc., in addition to a switching device 25 provided on the rear side of the fixation device 21.

When performing the double-sided printing, the paper reversing section 24 serving as a medium reversing section switches the switching device 25 to convey the paper P along the retraction path UR1, and then reverses the conveyance direction of the paper P to reverse the paper P from the retraction path UR1, under the control of the print controller 3. Thereafter, the paper reversing section 24 advances the paper P forward along the circulation path UR2 so as to return the paper P to the conveyance path U at the middle of the paper feeder 6. That is, the paper reversing section 24 returns the paper P upside down to the intermediate conveying section 10, so as to transfer an image to the back surface (the second-side) of the paper P. Note that, when the double-sided printing is not performed on the paper P, or when the image is transferred to the back surface (second side) of the paper P, the paper reversing section 24 causes the paper P to advance upwardly backward by using the switching device 25.

A paper discharge section 26 is arranged on the upper rear side of the fixation device 21 and the switching device 25. The paper discharge section 26 has a structure that is partially similar to the paper feeder 6, and includes conveyance guides, a plurality of rollers, and etc., that are appropriately arranged along the conveyance path U. By appropriately rotating the plurality of rollers and the like of the paper discharge section 26, the paper P that is conveyed from the fixation device 21 is conveyed along the conveyance guides of the paper discharge section 26 rearwardly upward and then is directed frontward, so as to be discharged on the discharge tray 27 formed on the upper surface of the housing 2.

[1-2. Configuration of Image Formation Unit]

Figure 2:
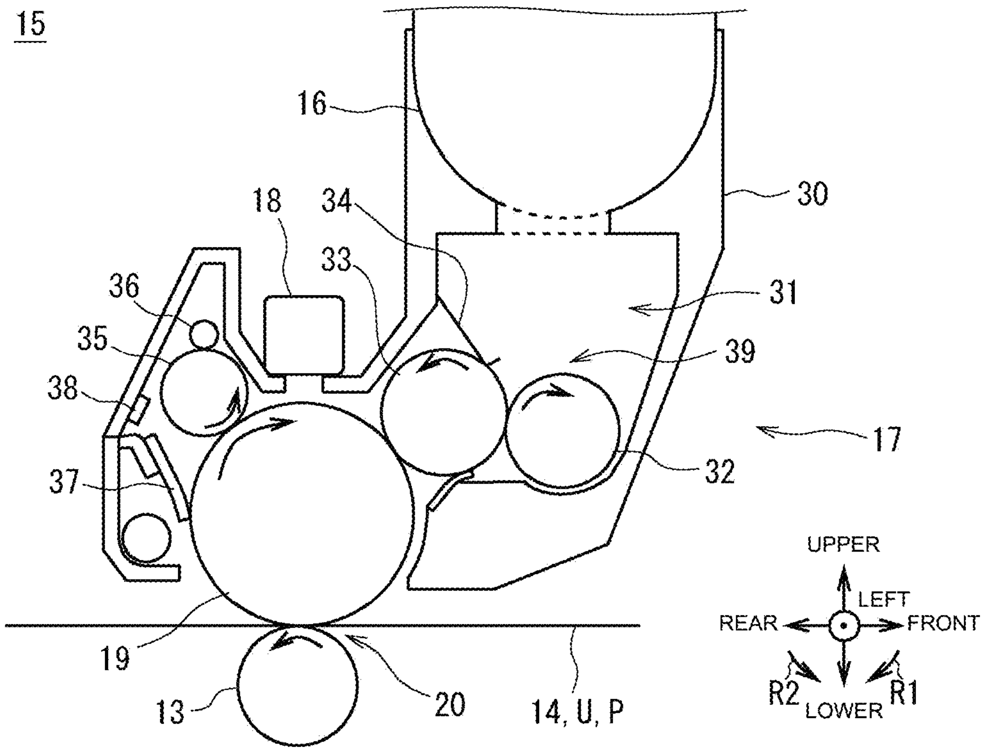
FIG. 2 is a schematic diagram illustrating a configuration of an image formation unit in the image formation apparatus.

Next, a configuration of the image formation unit 15 (15K, 15Y, 15M, 15C) will be described with reference to FIG. 2, which is a schematic side view thereof. As described above, each image formation unit 15 includes the toner cartridge 16, the image drum unit 17, the exposure head 18, and the like. The toner cartridge 16 has therein a space for storing the toner and a supply port formed at a lower side surface thereof and is configured to supply the toner from the supply port to the image drum unit 17.

The image drum unit 17 includes an image drum unit housing 30 constituting an outer shell of the image drum unit 17, and a toner storage space 31 provided in the image drum unit housing 30 and storing the toner therein. The image drum unit 17 also includes, at positions below and behind the toner storage space 31, a supply roller 32, a development roller 33, a development blade 34, a photosensitive drum 19, a charging roller 35, a cleaning roller 36, a cleaning member 37, a static eliminator 38, and the like that are appropriately arranged.

In a state where the toner cartridge 16 is attached to the upper side of the image drum unit housing 30, the toner storage space 31 of the image drum unit housing 30 receives and stores therein the toner supplied from the toner cartridge 16. The toner storage space 31 is provided with a toner stirring member (not illustrated), which appropriately stirs the stored toner to prevent the toner from agglomerating and smoothly supply the toner to the supply roller 32 and the like.

The supply roller 32, the development roller 33, the photosensitive drum 19, the charging roller 35, and the cleaning roller 36 each are configured in a cylindrical column shape or a cylindrical tubular shape with the center axis thereof extending in the left-right direction, and are rotatably supported. These rollers and drum are rotated by a driving force supplied from an image drum motor (not illustrated).

The supply roller 32 is arranged at a lower portion in the toner storage space 31. The development roller 33 is provided on the upper rear side of the supply roller 32 such that the development roller 33 is in contact with the supply roller 32 and the photosensitive drum 19. The supply roller 32 and the development roller 33 are each formed in a cylindrical shape with the center axis thereof extending in the left-right direction, and are supported rotatably about the respective center axes. The development blade 34 is formed in a thin plate shape, and has one end thereof fixed to the image drum unit housing 30 and the other end thereof abutted against the circumferential surface of the development roller 33 so as to apply an elastic force on the development roller 33.

The photosensitive drum 19 serving as an image carrier is formed in a cylindrical shape with the central axis thereof extending in the left-right direction, and is supported rotatably about the central axis thereof. The photosensitive drum 19 includes a thin charge generation layer and a thin charge transport layer sequentially formed on the circumferential surface thereof, and thus is able to be charged. The charging roller 35 serving as a charging part is formed in a cylindrical shape with the center axis thereof extending in the left-right direction, is supported rotatably about the center axis thereof such that the charging roller 35 is in contact with the upper rear portion of the circumferential surface of the photosensitive drum 19. The cleaning roller 36 is arranged above the charging roller 35 so as to be in contact with the charging roller 35. The cleaning roller 36 rotates along with the rotation of the charging roller 35 or rotates with the circumferential speed thereof different from that of the charging roller 35.

The exposure head 18 is also called an exposure device or the like, is formed in a shape of an elongated bar extending in the left-right direction, and is located above the photosensitive drum 19. The exposure head 18 includes a plurality of Light Emitting Diode (LED) elements serving as light emitting elements, arranged along a main scanning direction (e.g., the left-right direction), and also includes a rod lens array and the like. Based on the control of the print controller 3 (FIG. 2), the exposure head 18 causes the LED elements to emit light as appropriate, to irradiate the light downward while converging the light to focus the light at the upper end portion of the circumferential surface of the photosensitive drum 19, so as to expose the circumferential surface of the photosensitive drum 19. With this, an electrostatic latent image is formed on the circumferential surface of the photosensitive drum 19.

The cleaning member 37 is provided on the rear side of the photosensitive drum 19, and is made of a flexible resin material and has a thin plate shape. The cleaning member 37 includes a rear end thereof fixed to the image drum unit housing 30 and a front end thereof being in contact with the circumferential surface of the photosensitive drum 19. The static eliminator 38 includes light emitting elements such as LEDs, and is located on the rear upper side of the photosensitive drum 19. The static eliminator 38 emits light under the control of the print controller 3 to irradiate the light onto the circumferential surface of the photosensitive drum 19, so as to eliminate static electricity from the circumferential surface.

In this configuration, when performing printing process, each image formation unit 15 (15K, 15Y, 15M, and 15C) rotates the development roller 33, the charging roller 35, and the transfer roller 13 in the direction of arrow R2 and rotates the photosensitive drum 19 and the supply roller 32 in the direction of arrow R, under the control of the print controller 3.

At the same time, under the control of the print controller 3 and the high voltage controller 45, the image formation unit 15 supplies predetermined bias voltages from a charging voltage generator 51, a development voltage generator 52, a supply voltage generator 53, and a transfer voltage generator 54 (FIG. 3), to the charging roller 35, the development roller 33, the supply roller 32, and the transfer roller 13, respectively. Further, the image formation unit 15 causes the static eliminator 38 to emit the lights based on the control of the print controller 3.

The supply roller 32 causes, by the electrostatic charge, the toner in the toner storage space 31 to be adhered to the circumferential surface of the supply roller 32, and causes the toner that is adhered to the circumferential surface of the supply roller 32 to be adhered to the circumferential surface of the development roller 33 along with the rotation of the supply roller 32. The development blade 34 removes excessive toner from the circumferential surface of the development roller 33 to form a thin layer of toner on the circumferential surface of the development roller 33 as the development roller 33 rotates. The thin toner layer on the development roller 33 comes in contact with the circumferential surface of the photosensitive drum 19 as the development roller 33 rotates. For convenience of explanation, the supply roller 32, the development roller 33, and the development blade 34 may be collectively referred to as a development unit 39 below.

The charging roller 35 with being charged is in contacts the photosensitive drum 19, so as to uniformly charge the circumferential surface of the photosensitive drum 19. At this time, the cleaning roller 36 removes the toner and external additives of the toner that are adhered to the charging roller 35.

The print controller 3 generates image data based on the print data received from the external device, and provides the image data to the exposure head 18 as dot data for each line. The exposure head 18 emits the light in a light emission pattern based on the provided dot data, to expose the photosensitive drum 19 with the light. As a result, the electrostatic latent image is formed on the circumferential surface of the photosensitive drum 19 in the vicinity of the upper end of the photosensitive drum 19.

Then, along with the rotation of the photosensitive drum 19 in the direction of the arrow R2, the portion of the photosensitive drum 19 where the electrostatic latent image is formed comes in contact with the development roller 33. With this, the toner is adhered to the electrostatic latent image on the circumferential surface of the photosensitive drum 19, so that a toner image based on the image data is developed on the circumferential surface of the photosensitive drum 19. As the photosensitive drum 19 rotates, the developed toner image reaches a nip position (the nip portion) between the transfer roller 13 and the photosensitive drum 19, that is, a transfer position (the transfer portion) on the conveyance path U.

At this time, the image formation unit 15 applies by the transfer roller 13 the high voltage to the paper P that is being conveyed along the conveyance path U to the transfer position, so as to transfer at the transfer position the developed toner image onto the paper P from the circumferential surface of the photosensitive drum 19 due to the potential difference between the paper and the circumferential surface of the photosensitive drum 19. In this way, the image formation unit 15 forms the toner image based on the print data and transfer the toner image onto the paper P that is conveyed from the front side along the conveyance path U.

Further, the image formation unit 15 removes by the cleaning member 37 the toner that remains on the circumferential surface of the photosensitive drum 19 that has passed through the transfer position. Further, after the circumferential surface of the photosensitive drum 19 passes through the contact point with the cleaning member 37, the image formation unit 15 removes by the static eliminator 38 the static electricity on the circumferential surface of the photosensitive drum 19, so as to return the circumferential surface of the photosensitive drum 19 to a uniformly uncharged state.

[1-3. Circuit Configuration of Image Formation Apparatus]

Next, a circuit configuration of the image formation apparatus 1 will be described with reference to FIG. 3. The print controller 3 is a section that controls the image formation apparatus 1 in an integrated manner, and includes the CPU, ROM, RAM, and the like (not illustrated) as described above. The print controller 3 is connected to a storage 41, a command/image processor 43, an exposure head interface (I/F) 44, a high voltage controller 45, sensors 46, a temperature/humidity detector 47, a photosensitive drum 19, and the like.

The storage 41 comprises a nonvolatile storage medium such as an SSD (Solid State Drive) or an HDD (Hard Disk Drive), and stores various programs, various information, and the like. The print controller 3 uses the RAM as a work area and performs various processes by executing the various programs read from the ROM, the storage 41, and the like by the CPU.

A host interface (I/F) 42 is connected to the command/image processor 43, and is a part that serves as a physical layer interface in communication connections, such as a physical connector, a semiconductor chip component that performs communication processing, and/or the like. The host interface 42 functions as an interface for a wired LAN (Local Area Network) conforming to the standards such as IEEE (Institute of Electrical and Electronics Engineers) 802.3 u/ab/an/ae, a wireless LAN conforming to the standards such as IEEE 802.11 a/b/g/n/ac/ax, or the like, for example.

The host interface 42 can transmit and receive various information to and from the external device (may be referred to as a host computer, or the like), a server device, and the like (not illustrated) via a cable, a network, and the like (not illustrated).

The command/image processor 43 includes, for example, a microprocessor (not illustrated), a RAM, and a dedicated circuit for executing predetermined arithmetic processing. The command/image processor 43 acquires various commands, image data, and the like from the external device via the host interface 42, and executes processing such as interpretation of the commands, processing of developing the image data into bitmap data, and the like.

The exposure head interface (I/F) 44 includes a microprocessor, a RAM, and the like (not illustrated), and acquires the bitmap data from the command/image processor 43, performs predetermined processing on the bitmap data, and then supplies the processed data to the exposure heads 18 of the image formation units 15, respectively.

The high voltage controller 45 includes a microprocessor and the like (not illustrated) and controls the charging voltage generator 51, the development voltage generator 52, the supply voltage generator 53, and the transfer voltage generator 54 to generate the charging voltage, the development voltage, the supply voltage, and the transfer voltage, respectively.

The charging voltage generator 51 generates and stops the charging voltage to be supplied to the charging roller 35. The development voltage generator 52 generates and stops the development voltage to be supplied to the development roller 33. The supply voltage generator 53 generates and stops the supply voltage to be supplied to the supply roller 32. The transfer voltage generator 54 generates and stops the transfer voltage supplied to the transfer roller 13.

The sensors 46 are arranged at plural locations along the conveyance path U in the housing 2 (FIG. 1), and detect the presence or absence of the paper P. The temperature/humidity detector 47 includes an element that detect temperature and humidity, such as a thermistor or the like, and detects the ambient temperature and humidity.

The print controller 3 reads a predetermined program from the storage 41 and executes the program to thereby form therein functional blocks such as an information acquisition section 61, a voltage/coefficient acquisition section 62, an arithmetic processing section 63, and the like.

The information acquisition section 61 acquires, from the print data acquired from the external device, contents of various setting values set by the user, and the like, information regarding the paper P (that is, the medium), information regarding the printing process, and the like. The voltage/coefficient acquisition section 62 acquires a voltage value or a coefficient from the storage 41. The arithmetic processing section 63 performs various arithmetic process, such as process of calculating a voltage value to be generated in each voltage generator such as the charging voltage generator 51 and the like, using, for example, the coefficient acquired by the coefficient acquisition section 62.

Figure 4A:
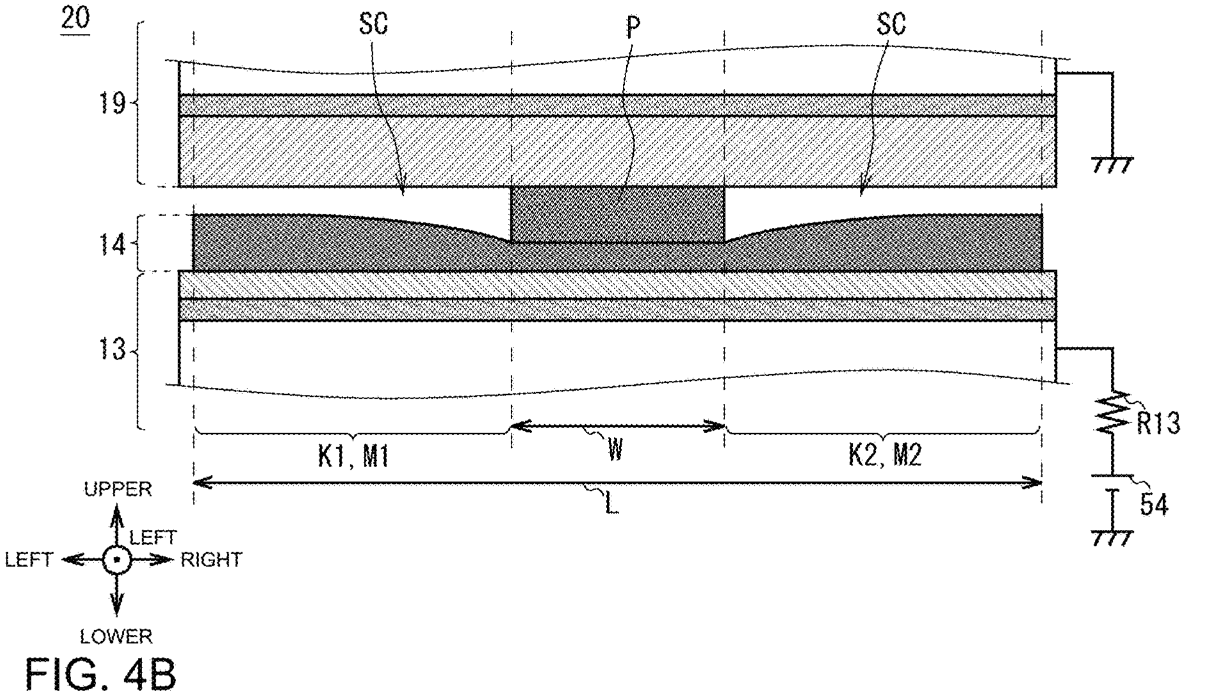
FIGS. 4A and 4B are schematic diagrams each of which illustrates gaps formed in a transfer portion.

The transfer voltage generator 54 supplies the transfer voltage to the transfer roller 13 via a transfer output resistor R13, as illustrated in the schematic diagram of FIG. 4A. The value of the electrical resistance in the transfer roller 13 fluctuates under the influence of temperature, humidity, and the like. Thus, the transfer voltage generator 54 detects the magnitude of the current supplied to the transfer roller 13, and calculates the electrical resistance value of the transfer roller 13, based on the magnitude of the detected current and the value of the transfer output resistor R13 as well as the values of the temperature and humidity detected by the temperature/humidity detector 47.

[2. Setting of Transfer Voltage]

The image formation apparatus 1 is configured to appropriately set the transfer voltage Vtr to be supplied from the transfer voltage generator 54 to the transfer roller 13 via the high voltage controller 45 based on the paper, the print setting, the temperature, the humidity, and the like. More specifically, the image formation apparatus 1 is configured to determine a reference transfer voltage Vtrs as a reference, calculate a correction transfer voltage Vtre (may be referred to as a transfer voltage correction value VTr) for correcting the reference transfer voltage Vtrs, and calculates the transfer voltage Vtr by adding the correction transfer voltage Vtre to the reference transfer voltage Vtrs. Furthermore, as will be described later, the image formation apparatus 1 is configured to calculate two types of the correction transfer voltage Vtre: a load/discharge correction transfer voltage Vtrel (may also be referred to as a first transfer voltage correction value) and a resistance correction transfer voltage Vtrer (may also be referred to as a second transfer voltage correction value).

The setting of the reference transfer voltage Vtrs and the calculation of the load/discharge correction transfer voltage Vtrel and the resistance correction transfer voltage Vtrer will be described in detail. Note that in the following description, a case where the printing process is performed on a first side of the paper P is referred to as first-side printing, and a case where the printing process is performed on a second side of the paper P during a double-sided printing is referred to as second-side printing.

[2-1. Setting of Reference Transfer Voltage]

As described above, when performing the transfer process, at the transfer portion 20 of the image formation apparatus 1, the toner image is transferred from the surface of the photosensitive drum 19 onto the surface of paper P by means of the high positive transfer voltage applied to the transfer roller 13. At this time, the paper P acts as an electric resistance in the transfer portion 20, so that the magnitude of the current flowing to the photosensitive drum 19 varies depending on the resistance value of the paper P. Therefore, in the transfer portion 20, it may be preferable to adjust the value of the transfer voltage depending on the magnitude of the resistance of the paper P.

It is known that the resistance of the paper P sandwiched at the transfer portion 20 varies depending on the surrounding humidity and temperature due to the nature of the paper. Therefore, in the image formation apparatus 1, as illustrated as a voltage table TV1 in FIG. 5, an appropriate reference transfer voltage Vtrs is set in advance for each combination of plural ranges of temperature Ti and plural ranges of humidity Hj such that the temperature T is divided in n ranges, which are predetermined integers, and the humidity H is divided into m ranges, which are predetermined integers, regarding paper P having a general thickness (hereinafter, referred to as thin paper).

Note that the subscript "i" attached to the temperature "T" is an integer less than or equal to "n", and the subscript "j" attached to the humidity "H" is an integer less than or equal to "m". Further, as will be described later, the voltage table TV1 represents the transfer voltage Vtr that is to be applied to the transfer roller 13 corresponding to the black image formation unit 15K (FIG. 1) when performing the first-side printing on the thin paper P.

Furthermore, the magnitude of the resistance of the paper P sandwiched at the transfer portion 20 varies depending on the thickness of the paper P (hereinafter may be referred to as a paper thickness or a medium thickness). Therefore, the image formation apparatus 1 uses a voltage table TV2 as illustrated in FIG. 6 which is prepared in advance for the paper P that is thicker than the paper P having the general thickness or the thin paper. As will be described later, the voltage table TV2 indicates the transfer voltage Vtr that is to be applied to the transfer roller 13 corresponding to the black image formation unit 15K (FIG. 1) when performing the first-side printing on the thick paper P.

In this way, the image formation apparatus 1 is configured, when performing the first-side printing (printing on a first-side of the paper), to read an appropriate reference transfer voltage Vtrs from the voltage table TV1 (FIG. 5) or the voltage table TV2 (FIG. 6), once the humidity, the temperature, and the thickness of the paper P are determined. Note that, both voltage tables TV1 and TV2 are stored in advance in the storage 41 (FIG. 3).

[2-2. Correction According to Load and Electric Discharge]

In the transfer portion 20 of the image formation apparatus 1, an electric discharge phenomenon may occur due to a dielectric breakdown between the surface of the transfer belt 14 and the photosensitive drum 19. The electric discharge phenomenon may affect the transfer process in the transfer portion 20. In the following, influence of the electric discharge phenomenon in the transfer process will be explained and also calculation of the transfer voltage in view of the electric discharge phenomenon will be explained.

First, an occurrence of the electric discharge phenomenon in the transfer portion 20 will be explained. FIG. 4A is a schematic diagram illustrating a state in which paper P that is a relatively short in the left-right direction (hereinafter may be referred to as narrow width) and a relatively thick and the transfer belt 14 are stacked to each other and sandwiched between the photosensitive drum 19 and the transfer roller 13 in the transfer portion 20. In the transfer portion 20, the photosensitive drum 19 behaves as a rigid body. Further, although the transfer belt 14 is slightly deformed in accordance with the shape of the paper P, the transfer belt 14 generally behaves as a rigid body.

That is, in the state illustrated in FIG. 4A, although the width of the paper P is shorter than the width of the photosensitive drum 19, the paper P is sufficiently thick so that the transfer belt 14 is not in direct contact with the photosensitive drum 19 and thus gaps SC are formed between the photosensitive drum 19 and the transfer belt 14 slightly separated from the photosensitive drum 19.

Further, as described above, in the transfer portion 20, when performing the transfer process, the toner image is transferred from the surface of the photosensitive drum 19 to the surface of the paper P with the high positive transfer voltage applied to the transfer roller 13. At this time, in the transfer portion 20, the paper P acts as a resistance, and the magnitude of the current flowing to the photosensitive drum 19 varies depending on the resistance value of the paper P. Therefore, it may be preferable to adjust the value of the transfer voltage depending on the magnitude of the resistance of the paper P.

The paper P has coefficient values related to the resistance such as a volume resistivity Ω·cm and a surface resistivity Ω/□ (or Ω/sq) depending on the paper quality and the like, such as the material constituting the paper P and the structure of the paper P. Therefore, the resistance value of the paper P can be calculated as a value obtained by multiplying the volume resistivity by the volume of the paper, or a value obtained by multiplying the surface resistivity by the surface area of the paper. Therefore, the image formation apparatus 1 according to an embodiment sets the value of the transfer voltage depending on the quality of the paper P and the like.

Figure 4B:
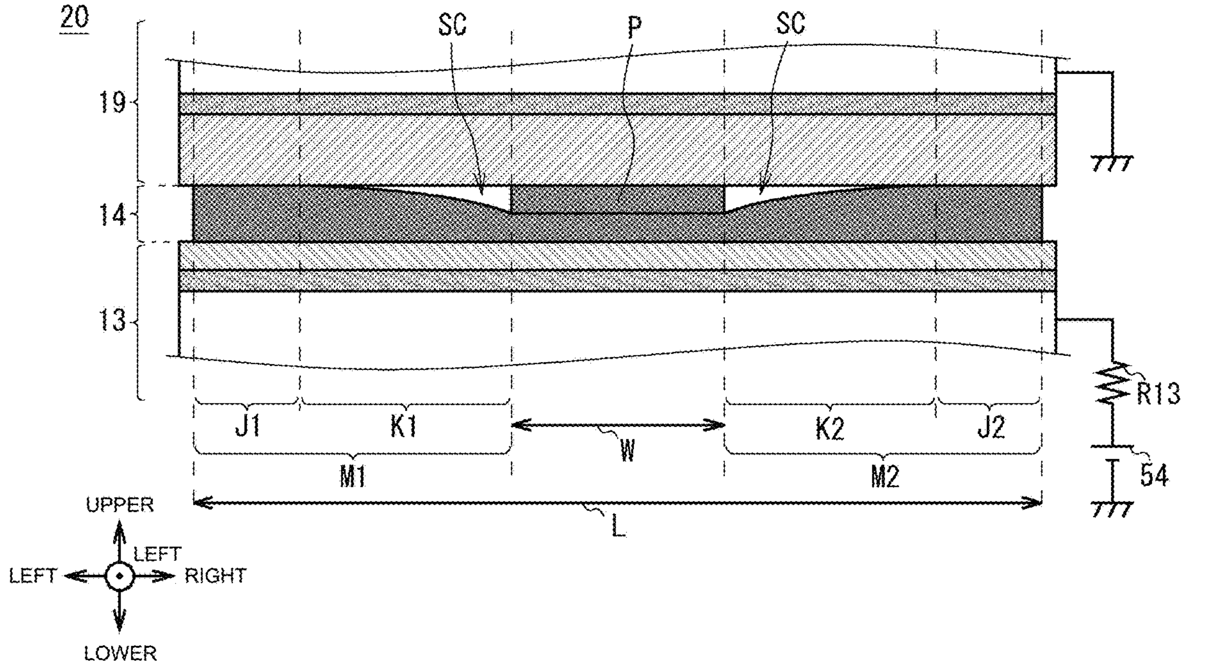

Next, FIG. 4B, which is to be compared with FIG. 4A, is a schematic diagram illustrating a state in which a narrow and relatively thin paper P and the transfer belt 14 are stacked to each other and sandwiched between the photosensitive drum 19 and the transfer roller 13 at the transfer portion 20. In the state illustrated in FIG. 4B, due to the relatively thin paper P, although relatively small gaps SC are respectively formed on the left and right sides of the paper P, the vicinity of each of the left and right end portions of the transfer belt 14 is in direct contact with the photosensitive drum 19. Hereinafter, such a state may be referred to as a belt-drum contact state.

For convenience of explanation, the length of the transfer belt 14 in the left-right direction (the width direction) of the transfer belt 14 is referred to as a transfer width L and the length of the paper P (that is, the medium) in the left-right direction (the width direction) of the transfer belt 14 is referred to as a medium width W. Further, portions of the area corresponding to the transfer width L excluding the area corresponding to the medium width W are referred to as medium-outside areas M (M1 and M2) (or areas M (M1 and M2) outside the medium). Further, a portion of each medium-outside area M in which the gap SC is formed between the transfer belt 14 and the photosensitive drum 19 is referred to as a gap area K (K1 and K2), and a portion of each medium-outside area M excluding the gap area K is referred to as a medium-outside contact area J (J1 and J2).

On the other hand, in FIG. 4A, the transfer belt 14 is separated from the photosensitive drum 19, and the medium-outside contact areas J are not formed. Therefore, in FIG. 4A, the entire medium-outside areas M (M1 and M2) are the gap areas K (K1 and K2). Hereinafter, such a state may be referred to as a belt-drum non-contact state.

Next, influence of a load and an electric discharge at the transfer portion 20 will be explained. As described above, a predetermined force is applied downward to each of the image formation units 15. Therefore, the force acting between the photosensitive drum 19 of each image formation unit 15 and the paper P at the respective transfer portion 20 is distributed according to the area of contact of the paper P and the transfer belt 14 with the photosensitive drum 19.

That is, in the belt-drum non-contact state (FIG. 4A) at the transfer portion 20, all of the force (hereinafter referred to as load) acting downwardly from the image formation unit 15 is applied to the paper P. Therefore, in the belt-drum non-contact state (FIG. 4A) at the transfer portion 20, the load per unit area varies depending on the medium width W, which is the width of the paper P.

In view of this, for example, the predetermined transfer voltage Vtr1 that is appropriate for the paper P having a relatively large medium width W1 may be excessive for the paper P having a medium width W2 smaller than the medium width W1. In such a case where an excessive voltage is applied to the paper P at the transfer portion 20, a phenomenon called "transfer blur" in which the toner image cannot be properly transferred may occur.

Next, the influence of the electric discharge in the transfer portion 20 will be explained. When the dielectric breakdown occurs in the gap regions K where the gaps SC are formed in the transfer portion 20, the electric charge moves between the transfer belt 14 and the photosensitive drum 19, to cause the electric discharge phenomenon. The degree of the electric discharge can be confirmed based on the amount of current flowing through the transfer roller 13.

That is, upon the transfer process of transferring the toner image from the photosensitive drum 19 to the paper P at the transfer portion 20, a part of the current (hereinafter referred to as a transfer current Itr) flowing from the transfer voltage generator 54 (FIG. 3) flows due to the electric discharge. Therefore, the transfer current Itr which is supplied from the transfer voltage generator 54 to the transfer roller 13 is categorized into a portion that flows as the electric discharge in the transfer portion 20 and the remaining portion, and the remaining portion flows through the paper P to transfer the toner image. Therefore, the image formation apparatus 1 according to an embodiment is configured to correct the transfer voltage in view of the fact that a part of the current flows in the gaps SC due to the electric discharge.

Further, for example, in a situation where by supplying a predetermined transfer current Itr to the transfer roller 13, a desired current density on the paper P is achieved to appropriately transfer a toner image, if a proportion of the current of the electric discharge increases, the desired current density on the paper cannot be achieved so that printing defects such as transfer blurring may occur. Therefore, when the thickness of the paper P increases and thus the thickness of the gaps SC in the transfer portion 20 (the distance between the transfer belt 14 and the photosensitive drum 19 in the vertical direction) increases, it may be preferable to increase a correction amount of the transfer voltage. Further, when the medium width W is changed and thus the widthwise sizes of the gap regions K in the transfer portion 20 change, the current of the electric discharge in the transfer portion 20 changes (increases or decreases).

Therefore, the image formation apparatus 1 according to an embodiment is configured to adjust the amount of correction to the transfer voltage according to the information regarding the paper P that affects the thickness of the gaps SC and the widthwise sizes of the gap areas K, that is, according to the information on the medium width W and the thickness of the paper P.

In this way, the influence of the load and the electric discharge at the transfer portion 20 is proportional to the medium width W. Therefore, first, the minimum width Wmin (for example, 70 mm) which is the minimum value of the medium width W and the maximum width Wmax (for example, 297 mm) which is the maximum value of the medium width W are defined. As a result, the medium width W satisfies the following equation (1).

[Equation 1]

$$Wmin \leq W \leq Wmax \tag{1}$$

Further, as described above, it is not necessary to consider the influence of the load and the electric discharge at the transfer portion 20 when the medium width W is the maximum width Wmax, and as the value of the medium width W becomes smaller, the influence of the load and the electric discharge at the transfer portion 20 increases. Therefore, in an embodiment, the influence of the load and the electric discharge is to be calculated as a numerical value by multiplying the difference (Wmax-W) between the maximum width Wmax and the medium width W with the maximum width Wmax being a reference value for the medium width W, by a predetermined load coefficient p representing the influence of the load, and a predetermined electric discharge coefficient q representing the influence of the electric discharge.

Based on this policy, the load/discharge correction transfer voltage Vtrel, which is a correction value for correcting the transfer voltage to reduce or eliminate the influence of the load and the electric discharge, can be expressed as in the following equation (2) by using the medium width W, the maximum width Wmax, the load coefficient p, and the electric discharge coefficient q. Note that the medium width W satisfies the above-mentioned equation (1).

[Equation 2]

$$Vtrel = p\,(Wmax - W) + q\,(Wmax - W) \tag{2}$$

The equation (2) can be expressed as the following equation (3), by rearranging the parts related to the medium width W and the maximum width Wmax in the equation (2) and further replacing the term (p-q) with a load/discharge correction coefficient A.

[Equation 3]

$$Vtrel = (p - q)\ (Wmax - W) = A\,(Wmax - W) \tag{3}$$

The appropriate value of the load/discharge correction coefficient A is considered to vary depending on the temperature Ti and the humidity Hj, as in the case of the reference transfer voltage Vtrs. Therefore, in the image formation apparatus 1 according to an embodiment, an appropriate value of the load/discharge correction coefficient Aij for each of the case where the paper P is thin paper and the case where the paper P is thick paper is sets in advance, as illustrated in a correction table TA11 of FIG. 7 and a correction table TA21 of FIG. 8.

These correction tables TA11 and TA21 are both stored in advance in the storage 41 (FIG. 3), like the voltage tables TV1 and TV2 (FIGS. 5 and 6).

Here, a relationship between the medium width W and the load/discharge correction transfer voltage Vtrel will be explained with reference to the graphs of FIGS. 9 and 10. Each of characteristic curves Qp, Qq, and QA illustrated in FIGS. 9 and 10 represents the relationship between the medium width W and the voltage (i.e., the value obtained by multiplying the coefficients and the medium width W). FIG. 9 illustrates the case where the paper P is the thin paper, whereas FIG. 10 illustrates the case where the paper P is the thick paper.

Comparing FIGS. 9 and 10, it can be seen that since the thickness of the gaps SC in the transfer portion 20 differs depending on the thickness of the paper P, the slope of the characteristic curve Qp due to the load and the slope of the characteristic curve Qq due to the electric discharge are different between the cases of the thin paper and the thick paper. As a result, the slopes of the characteristic curves QA are also different between FIG. 9 (thin paper) and FIG. 10 (thick paper).

[2-3. Correction According to Transfer Order]

By the way, in the image formation apparatus 1, the four image formation units 15 are arranged along the front-rear direction so that the toner images of the respective colors formed by the four image formation units 15 are sequentially transferred at the four transfer portions 20 to the paper P being conveyed along the conveyance path U by the intermediate conveying section 10.

In the image formation apparatus 1, a constant voltage is applied to each transfer portion 20 even when not transferring the toner image of the respective color. Therefore, as the paper P moves from the upstream side to the downstream side in the traveling direction of the paper P, the conveyed paper P becomes electrically charged more and thus the electrical resistance value thereof increases accordingly. Hereinafter, such a phenomenon may be referred to as charge-up. In addition, when the paper P has a relatively high resistance value, such as when the paper P is an OHP sheet or the like or when the base material of the paper P is PET (Poly Ethylene Terephthalate) resin or the like, the degree of the charge-up also increases.

In the image formation apparatus 1 (FIG. 1) according to an embodiment, from the upstream side to the downstream side along the conveyance path U, the black, yellow, magenta, and cyan image formation units 15K, 15Y, 15M, and 15C are arranged in that order, that is, the transfer portions 20 for the black (K), yellow (Y), magenta (M), and cyan (C) toner images are arranged in that order. Therefore, although the transfer portion 20 for the black (K) toner image (that is, the first transfer portion 20 in the transfer order) is not affected by charge-up, the transfer portion 20 for the cyan (C) toner image (that is, the fourth transfer portion 20 in the transfer order) is significantly affected by charge-up.

Based on the relationships described above, the image formation apparatus 1 according to an embodiment sets the appropriate load/discharge correction coefficient values in advance according to the arrangement order of the transfer portions 20, for each combination of the temperature Ti and the humidity Hj, as illustrated in FIGS. 11, 12, and 13 as the correction tables TA12, TA13, and TA14, respectively. That is, the correction tables TA12, TA13, and TA14 illustrated in FIGS. 11, 12, and 13 are for the yellow (Y), magenta (M), and cyan (C) image transfer portions 20, respectively, that is, for the second transfer portion 20, the third transfer portion 20, and the fourth transfer portion 20, respectively, in the transfer order. Note that the correction table TA11 illustrated in FIG. 7 is for the black (K) toner image transfer portion 20, that is, for the first transfer portion 20 in the transfer order.

Figures 14, 15, 16:
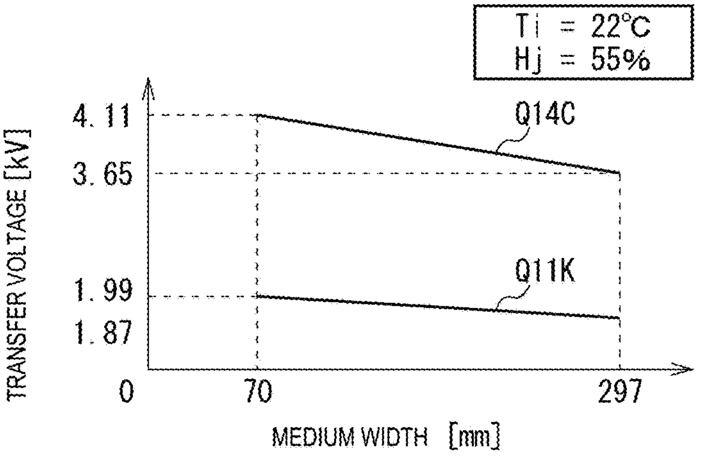
FIG. 14 is a schematic diagram illustrating a relationship between a medium width and a transfer voltage for the first and fourth transfer portions in the transfer order.
FIG. 15 is a schematic diagram illustrating a correction table for the first transfer portion in the transfer order in a second-side printing.
FIG. 16 is a schematic diagram illustrating a correction table for the second transfer portion in the transfer order in the second-side printing.

Here, a relationship between the medium width of the paper P and the appropriate applied voltage for each of the first transfer portion 20 (the black (K) toner image transfer portion) on the most upstream side and the fourth transfer portion 20 (the cyan (C) toner image transfer portion) on the most downstream side is obtained and is illustrated in the graph of FIG. 14. FIG. 14 indicates that the characteristic curve Q11K for the first transfer portion (the black (K) toner image transfer portion) is located below the characteristic curve Q14C for the fourth transfer portion (the cyan (C) toner image transfer portion), and indicates trends in which as the medium width increases the applied voltage decreases in both of the characteristic curve Q11K and the characteristic curve Q14C.

[2-4. Correction according to Second-Side Printing]

The image formation apparatus 1 is provided with the paper reversing section 24 (FIG. 1) as described above, and is configured, when the print data includes an instruction to perform double-sided printing (the first-side printing and the second-side printing), to use the paper reversing section 24 to perform printing process on both sides (the first side and the second side) of the paper P.

Specifically, the image formation apparatus 1 transfers a toner image from each image formation unit 15 to a first side (a first surface or a front surface) of paper P while conveying the paper P by the intermediate conveying section 10, fixes the transferred toner images on the first side of the paper P by the fixation device 21 applying heat and pressure to the paper P, and then flips the paper P and returns the flipped paper P to the paper feeding section 6 by the paper reversing section 24. Subsequently, the image formation apparatus 1 transfers a toner image from each image formation unit 15 to a second side (a second surface or a back surface) of the paper P while conveying the paper P by the intermediate conveying section 10, fixes the transferred toner images on the second side of the paper P by the fixation device 21 applying heat and pressure to the paper P, and then discharges the paper P onto the discharge tray 27 by the paper discharge section 26.

Accordingly, when printing on the first side of the paper, the heat and pressure are applied to the paper P by the fixation device 21, which reduces the moisture amount of the paper P, thereby increasing the electric resistance value of the paper P. For this reason, when printing on the second side of the paper P, the electrical resistance value is increased although the thickness remains unchanged compared to when printing on the first side of the paper P. Therefore, it is preferable to increase the transfer voltage when printing on the second side of the paper P.

Based on the relationships described above, the image formation apparatus 1 sets and stores in advance, for the second-side printing, the appropriate load/discharge correction coefficient value A for each combination of the temperature Ti and the humidity Hj, as illustrated in each of correction tables TA31, TA32, TA33, and TA34 in FIGS. 15, 16, 17, and 18. The correction tables TA31, TA32, TA33, and TA34 illustrated in FIGS. 15, 16, 17, and 18 are the tables for the first, second, third, and fourth transfer portions 20 in the transfer order, respectively, and each indicates the appropriate values of the load/discharge correction coefficient A for the second-side printing. Note that the correction tables TA11, TA12, TA13, and TA14 illustrated in FIGS. 7, 11, 12, and 13 correspond to the correction tables TA31, TA32, TA33, and TA34 illustrated in FIGS. 15, 16, 17, and 18, respectively and each indicates the appropriate values of the load/discharge correction coefficient A for the first-side printing.

Figures 17, 18, 19:
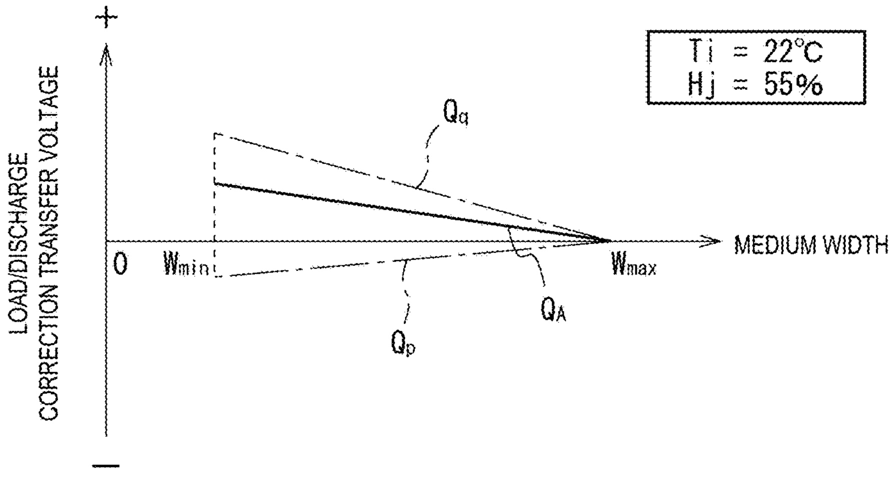
FIG. 17 is a schematic diagram illustrating a correction table for the third transfer portion in the transfer order in the second-side printing.
FIG. 18 is a schematic diagram illustrating a correction table for the fourth transfer portion in the transfer order in the second-side printing.
FIG. 19 is a schematic diagram illustrating a relationship between a medium width and a load/discharge correction transfer voltage when performing the second-side printing on the thin paper.
Figure 20:
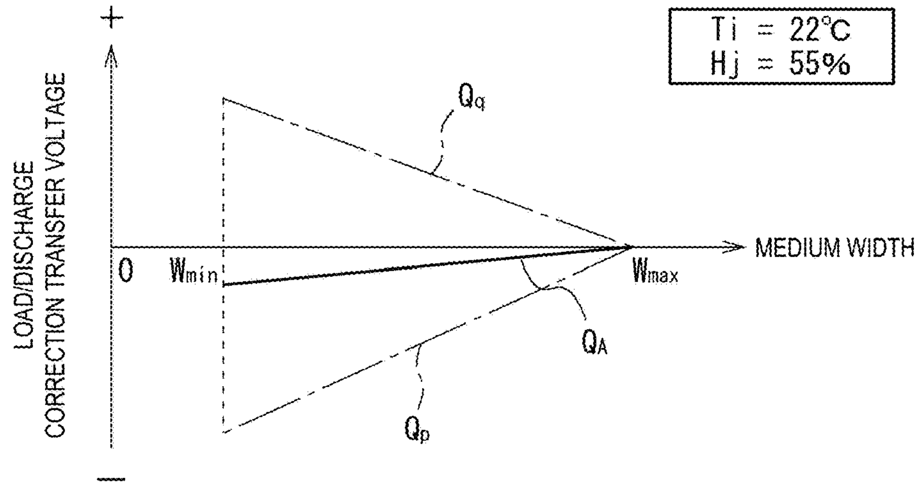
FIG. 20 is a schematic diagram illustrating the relationship between the medium width and the load/discharge correction transfer voltage when performing the second-side printing on the thick paper.

Appropriate transfer voltage correction values (that is, load/discharge correction transfer voltage values) when performing the second-side printing on the thin paper and the thick paper are illustrated as the characteristic curves illustrated in FIGS. 19 and 20, which are to be compared with FIGS. 9 and 10, respectively.

By comparing FIGS. 9 and 19, it can be seen that the influence of the electric discharge is greater in the second-side printing than that in the first-side printing, that is, the slope of the characteristic curve Qq is steeper in the second-side printing than that in the first-side printing. Along with this, the slope of the characteristic curve QA in the second-side printing (FIG. 19) also steeper than that in the first-side printing (FIG. 9). Such tendencies also appear between FIGS. 10 and 20.

Figure 21:
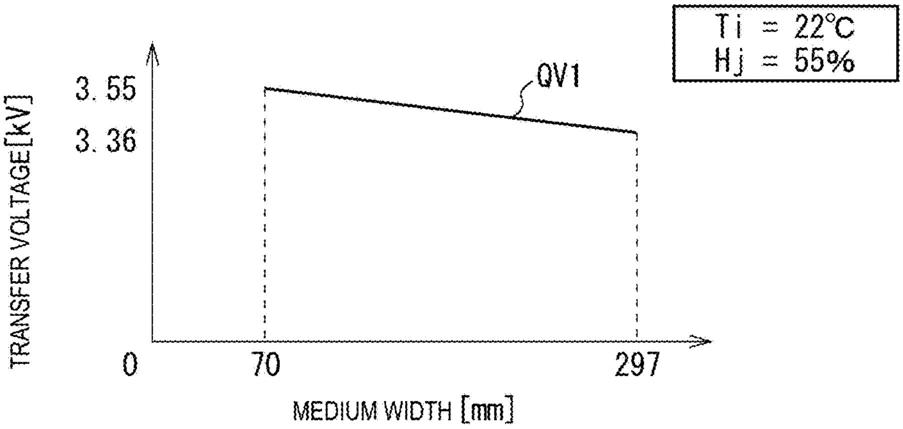
FIG. 21 is a schematic diagram illustrating the relationship between the medium width and the transfer voltage when performing the second-side printing on the thin paper.
Figure 22:
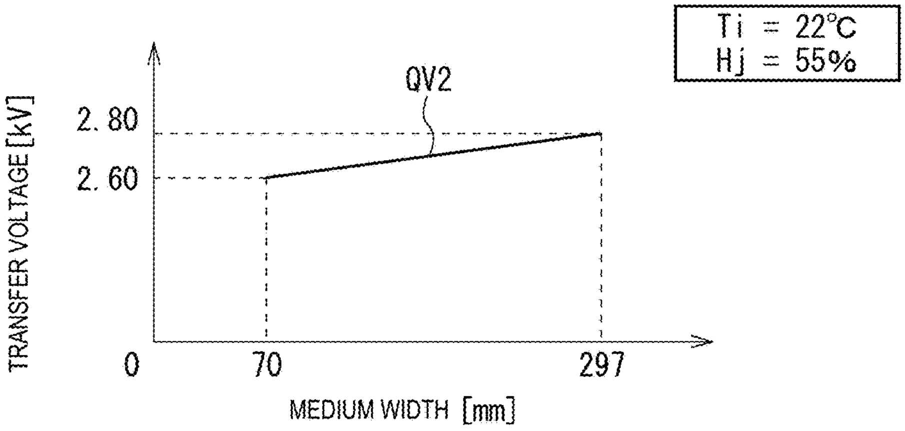
FIG. 22 is a schematic diagram illustrating the relationship between the medium width and the transfer voltage when performing the second-side printing on the thick paper.

Here, a voltage characteristic curve QV1 for the thin paper and a voltage characteristic curve QV2 for the thick paper, such as being illustrated in FIGS. 21 and 22, are obtained by calculating the load/discharge correction coefficient A in the second-side printing while varying the medium width and calculating the transfer voltage Vtr based on the calculated correction coefficient. Note that in the calculation of each of the voltage characteristic curves QV1 and QV2, the temperature Ti is set to 22° C., and the humidity Hj is set to 55%.

In FIG. 21, the voltage characteristic curve QV1 for the thin paper indicates that the transfer voltage Vtr decreases as the medium width W increases. To the contrary, in FIG. 22, the voltage characteristic curve QV2 for the thick paper indicates that the transfer voltage Vtr increases as the medium width W increases. Also, the range in which the transfer voltage Vtr for the thin paper fluctuates is 3.36 [V] or more and 3.55 [V] or less, while the range in which the transfer voltage Vtr for the thick paper fluctuates is 2.60 [V] or more 2.80 [V] or less. That is, the range in which the transfer voltage Vtr for the thin paper fluctuates and the range in which the transfer voltage Vtr for the thick paper fluctuates are greatly different from each other.

[2.5. Correction according to Conveyance Speed]

Next, a relationship between the conveyance speed of the paper P and the electrical resistance value of the paper P will be explained. In general, the thick paper having a relatively large thickness has a large electrical resistance, so that it is necessary for the thick paper to flow a relatively large amount of current per unit area during the transfer process in the transfer portion 20. For this reason, the image formation apparatus 1 according to an embodiment is configured, when performing printing process on the thick paper P, to control the conveyance speed to be lower (slower) than that for the thin paper P.

Next, a relationship between the thickness of the paper P and the conveyance speed will be explained with reference to equations. First, it is assumed that the conveyance speed of the paper P is v mm/s, the medium width is W mm, and the length along the conveyance direction (the front-rear direction) of the portion where the medium is nipped in the transfer portion 20 is N mm. Further, it is assumed that the current density of the current flowing through the paper P upon applying the transfer voltage Vtr is J[A/mm2], and the length of the paper P along the conveyance direction is D mm.

In this case, the time t [s] required for the entire portion of the paper P to pass through the transfer portion 20 is D/v[s]. Thus, the total amount of current I [A] flowing through the paper P while the entire portion of the paper P passes through the transfer portion 20 is calculated by the following equation (4).

[Equation 4]

$$I = \int_0^{D/v} N \times w \times J dt \tag{4}$$

From the equation (4), it can be seen that in the image formation apparatus 1, when the conveyance speed v is relatively high (fast), the total amount of current I flowing through the paper P becomes relatively small. In this case, if the image formation apparatus 1 makes the reference transfer voltage Vtrs relatively large to increase the value of the transfer voltage Vtr, voltage shortage can be avoided to perform a good transfer process.

Further, from the equation (4), it can be seen that in the image formation apparatus 1, when the conveyance speed v is relatively small (slow), the total amount of current I flowing through the paper P becomes relatively large. In this case, if the image formation apparatus 1 makes the reference transfer voltage Vtrs relatively small to reduce the value of the transfer voltage Vt, excessive voltage can be avoided to perform a good transfer process.

In this way, it may be preferable that the image formation apparatus 1 applies, to the transfer roller 13, the transfer voltage Vtr that is taken into account both the conveyance speed v of the paper P and the electric resistance value of the paper P. Furthermore, from equation (4), it can be seen that when the medium width W is changed, the influence of the electric discharge on the transfer voltage Vtr also appears differently depending on the conveyance speed v.

Therefore, the image formation apparatus 1 according to an embodiment sets and stores in advance the appropriate value of the load/discharge correction coefficient Aij for each combination of the temperature Ti and the humidity Hj when printing process is performed on the thin paper P while the conveyance speed v of the paper P is low, such as being illustrated in the correction table TA41 in FIG. 23.

[2-6. Classification Based on Thickness and Resistance of Paper]

As a rough classification of the paper P, the paper P is classified into two types of the thick paper and the thin paper in terms of the thickness of the paper and into two types of the high resistance (high resistance value) and the low resistance (low resistance value) in terms of the electrical resistance of the paper. That is, the paper P is classified into two types of the thickness and two levels of the electrical resistance, thereby classified into the four types in total.

The classification in terms of the thickness of the paper P and the electrical resistance value of the paper P can be expressed as a matrix divided into four quadrants, with the axis of the thickness and the axis of the electrical resistance value intersecting each other, as illustrated in the schematic diagram of FIG. 24. In FIG. 24, the paper P that is thin and low resistance is designated as "Type 1", the paper P that is thin and high resistance is designated as "Type 2", the paper P that is thick and low resistance is designated as "Type 3", and the paper P that is thick and high resistance is designated as "Type 4".

Typical physical properties of the paper P of Type 1 (thin and low resistance paper) include, for example, a volume resistivity of $3.53\times10^{10}\Omega\cdot$cm, and the surface resistivity of $1.68\times10^{11}\Omega/\square$, and the paper thickness of 100 μm. Examples of the paper P of Type 1 include Excellent White (manufactured by Oki Electric Industry Co., Ltd.), which is a relatively thin plain paper.

Typical physical properties of the paper P of Type 2 (thin and high resistance paper) include, for example, the volume resistivity of $1.22\times10^{17}\Omega\cdot$cm, the surface resistivity of $6.24\times10^{14}\Omega/\square$, and the paper thickness of 140 μm. Examples of the paper P of Type 2 include Laser Peach 145 (registered trademark, Daio Paper Co., Ltd.), which is a relatively thin waterproof paper, as well as various paper whose base materials are films and OHP sheets.

Typical physical properties of the paper P of Type 3 (thick and low resistance paper) include, for example, the volume resistivity of $3.41\times10^{10}\Omega\cdot$cm, and the surface resistivity of $4.34\times10^{10}\Omega/\square$, and the paper thickness of 200 μm. Examples of the paper P of Type 3 include Color Copy 200, which is relatively thick plain paper, as well as postcards, envelopes, and the like.

Typical physical properties of the paper of Type 4 (thick and high resistance paper) include, for example, the volume resistivity of $3.72\times10^{15}$ Ω2·cm, and the surface resistivity of $1.40\times10^{13}\Omega/\square$, and the paper thickness of 235 μm. Examples of the paper P of Type 4 include Lamifree (registered trademark, Nakagawa Seisakusho Co., Ltd.), which is a relatively thick waterproof paper.

Note that the physical property values of each paper P are measured using a digital ultra high resistance/micro current meter (ULTRA HIGH RESISTANCE METER, manufactured by Advantest Corporation) and a RESISTIVITY CHAMBER (manufactured by Advantest Corporation).

The paper P of Type 1 is the thin and low-resistance paper. Accordingly, it is possible to set the value of the transfer voltage Vtr small and thus to ignore both the influence of the load and the influence of the electric discharge. In such a case, it may be preferable that the correction transfer voltage Vtre is set to the value "0" regardless of the medium width W. Therefore, the transfer voltage Vtr for the paper P of Type 1 has a constant value regardless of the medium width W, as illustrated by the characteristic curve QVT1 in FIG. 25. Note that in FIG. 25, as the paper P that can be printed by the image formation apparatus 1, the minimum value and the maximum value of the medium width W of the paper are 70 mm and 297 mm, respectively.

The paper P of Type 2 is the thin and high-resistance paper. Accordingly, if the paper P of Type 2 is conveyed at the conveyance speed v same as the low-resistance paper P, the transfer voltage Vtr may be required to be an extremely high value in order to properly perform the transfer process, and such an extremely high voltage may lead to occurrence of printing defects, damage to the transfer member, and the like. For the reason, it may be preferable that the image formation apparatus 1 sets the conveyance speed v to be relatively low (slow) for the paper P of Type 2, so as to suppress the transfer voltage Vtr to a value as low as possible.

Referring again to the equation (4), when the conveyance speed v becomes low (slow), the transfer voltage Vtr can be reduced. However, even if the medium width W becomes smaller, the influence of the electric discharge becomes relatively large since the influence of the load is small. Therefore, it may be preferable that, when using the paper P of Type 2, the image formation apparatus 1 controls such that as the medium width W increases, the influence of the electric discharge increases and the transfer voltage Vtr gradually decreases, as illustrated in the characteristic curve QVT2 in FIG. 25.

The paper P of Type 3 is the thick and low resistance paper. Accordingly, in the transfer portion 20, the smaller (narrower) the medium width W is, the greater the load per unit area applied to the paper P and the lower the contact resistance. Therefore, it may need to make a correction that takes into account the influence of the load. On the other hand, although the gaps SC (FIG. 4) are formed in the transfer portion 20 because the paper P of Type 3 is thick, the transfer voltage Vtr has a relatively small value because the paper P of Type 3 has the low resistance. As a result, the influence of the electric discharge is relatively small for the paper P of Type 3.

Therefore, when using the paper P of Type 3, it may be preferable that the image formation apparatus 1 controls such that as the medium width W increases, the influence of the load becomes smaller and the transfer voltage Vtr gradually increases, as illustrated in the characteristic curve QVT3 illustrated in FIG. 25.

The paper P of Type 4 is the thick and high resistance paper. Accordingly, both the load and the electric discharge have relatively large effects. However, the paper P of Type 4 may have a special layer formed on the surface thereof for the purpose of improving toner fixability and toner image quality.

Therefore, regarding the paper P of Type 4, when the medium width W differs, the value of the correction transfer voltage Vtre also differs. As an example, if the paper P of Type 4 is Lamifree (registered trademark), it may be preferable that the image formation apparatus 1 controls such that the transfer voltage Vtr gradually increases as the medium width W increases, as illustrated in the characteristic curve QVT4 illustrated in FIG. 25.

Figures 26, 27:
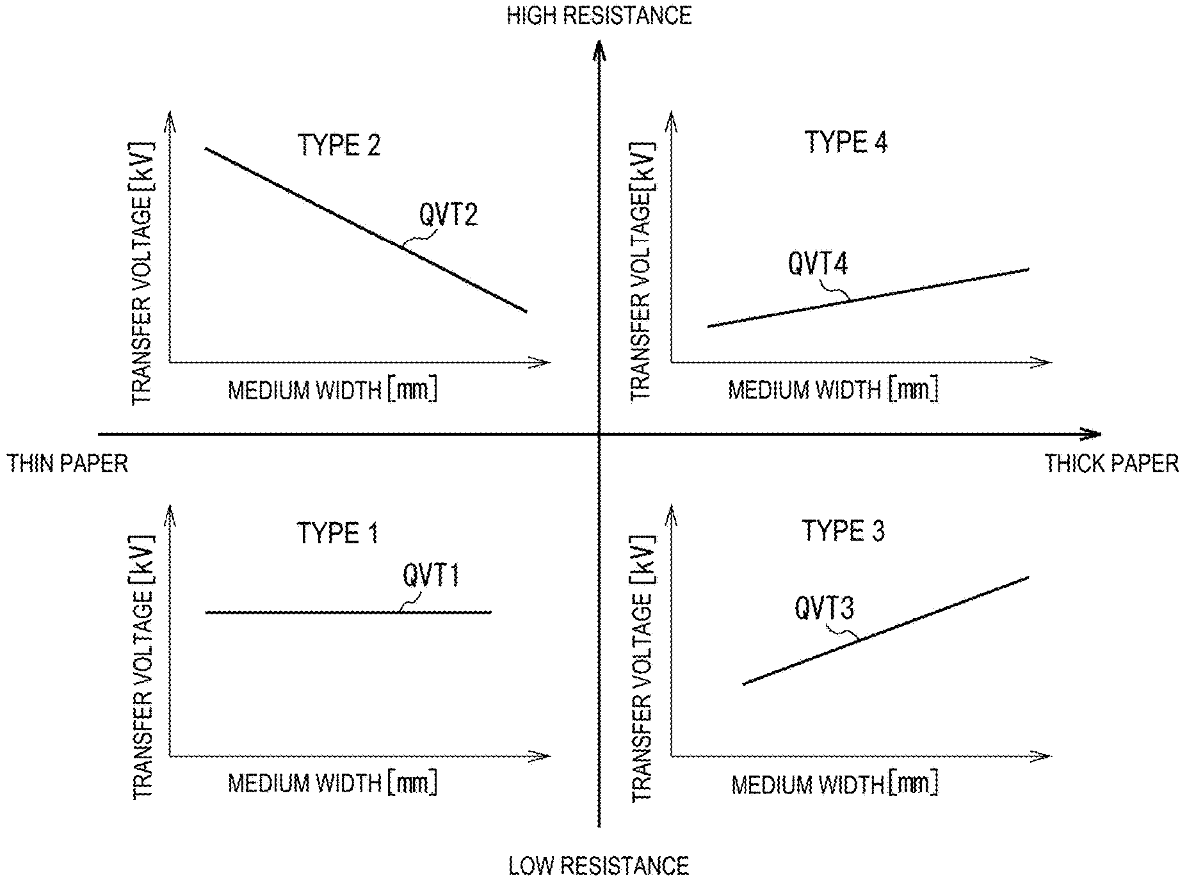
FIG. 26 is a schematic diagram illustrating a relationship between the medium width and the transfer voltage for each paper type, classified by the thickness and the electrical resistance value of the paper.
FIG. 27 is a schematic diagram illustrating a narrow medium transfer voltage, a wide medium transfer voltage, and a transfer voltage ratio for each of the paper of Type 2 and Type 3.

FIG. 26 is a conceptual diagram in which the characteristic curves QVT1 to QVT4 illustrated in FIG. 25 are arranged in a matrix like FIG. 24 according to the paper thickness and the electrical resistance value. As can be seen from FIG. 26, in the image formation apparatus 1, the relationship between the medium width W of the paper P and the appropriate transfer voltage Vtr differs depending on the classifications (i.e., types) of the paper P that is classified based on the paper thickness and the electrical resistance value of the paper P.

As described above, when using the paper P of Type 1, the influence of the configuration of the transfer portion 20 is small, so the amount of change in the transfer voltage Vtr with respect to the change in the medium width W can be ignored. When using the paper P of Type 4, any quantitative or qualitative characteristics regarding the relationship between the medium width W and the transfer voltage Vtr cannot be found based only on the configuration of the transfer portion 20.

To the contrary, for the paper of Types 2 and 3, the characteristics of each classification can be expressed quantitatively based on the configuration of the transfer portion 20. FIG. 27 summarizes in a table format the values of the transfer voltage Vtr that are calculated for the case where the medium width W is the smallest (narrowest) (hereinafter referred to as a narrow width) and for the case where the medium width W is largest (widest) (hereinafter referred to as a wide width), for each of Types 2 and 3.

Here, as in the case of FIG. 25, the minimum value and the maximum value of the medium width W of the paper are set to 70 mm and 297 mm, respectively. Furthermore, hereinafter, the transfer voltage Vtr for the minimum width medium (the narrow medium) is referred to as a narrow medium transfer voltage Vtrn, and the transfer voltage Vtr for the maximum width medium (the wide medium) is referred to as a wide medium transfer voltage Vtrw.

FIG. 27 also indicates a transfer voltage ratio RVtr, which is a ratio of the narrow medium transfer voltage Vtrn to the wide medium transfer voltage Vtrw for each of Type 2 and Type 3. That is, a relationship among the wide medium transfer voltage Vtrw, the narrow medium transfer voltage Vtrn, and the transfer voltage ratio RVtr can be expressed as in the following equation (5).

[Equation 5]

$$RVtr = Vtrn/Vtrw \quad (5)$$

As illustrated in FIGS. 25 and 26, the characteristic curve QVT2 for the paper P of Type 2 represents a downward-sloping characteristic in which the transfer voltage Vtr decreases as the medium width W increases. Therefore, the transfer voltage ratio RVtr for the paper P of Type 2 (hereinafter may be referred to as a Type-2 transfer voltage ratio RVtr2) is larger than one.

To the contrary, the characteristic curve QVT3 for the paper P of Type 3 represents an upward-sloping characteristic, in which the transfer voltage Vtr increases as the medium width W increases. Therefore, the transfer voltage ratio RVtr for the paper P of Type 3 (hereinafter may be referred to as a Type-3 transfer voltage ratio RVtr3) is smaller than one.

Therefore, the following equation (6) is established between the Type-2 transfer voltage ratio RVtr2 and the Type-3 transfer voltage ratio RVtr3.

[Equation 6]

$$RVtr2 > RVtr3 \quad (6)$$

That is, in the image formation apparatus 1 according to an embodiment, the value of the load/discharge correction coefficient A in each of the correction tables such as the correction table TA11 (FIG. 7) is properly defined in such a manner that the transfer voltage ratio RVtr3 for Type 3 is smaller than the transfer voltage ratio RVtr2 for Type 2.

Here, the paper P of Type 2 that has a first thickness (a predetermined thickness that is relatively small), a first resistance (a predetermined resistance (volume resistivity or surface resistivity)), and the medium width W of 70 mm (that is, a first width) is referred to as a first medium, and the transfer voltage suitable for the first medium is referred to as a first transfer voltage.

Similarly, the paper P of type 2 that has the first thickness and the first resistance, but has the medium width W of 297 mm (this is, a second width) is referred to as a second medium, and the transfer voltage that is suitable for the second medium is referred to as a second transfer voltage.

To the contrary, the paper P of type 3 that has a second thickness larger than the first thickness, a second resistance smaller than the first resistance, and the first width is referred to as a third medium and the transfer voltage that is suitable for the third medium is referred to as a third transfer voltage.

Similarly, the paper P of type 3 that has the second thickness, the second resistance, and the second width is referred to as a fourth medium, and the transfer voltage that is suitable for the fourth medium is referred to as a fourth transfer voltage.

That is, the image formation apparatus 1 is configured to calculate and supply the transfer voltage such that a first voltage ratio, which is a ratio of the first transfer voltage to the second transfer voltage for the paper of Type 2, is greater than a second voltage ratio, which is a ratio of the third transfer voltage to the fourth transfer voltage for the paper of Type 3.

[2-7. Correction According to Fluctuation in Resistance Value]

When the transfer voltage Vtr is applied from the transfer voltage generator 54 to the transfer roller 13 in the transfer portion 20 of the image forming apparatus 1, the electric current flows to the transfer roller 13, the transfer belt 14, the paper P, and the photosensitive drum 19. At this time, the transfer roller 13, the transfer belt 14, and the photosensitive drum 19 that constitute the transfer portion 20 all act as electrical resistance. These resistance values vary greatly depending on the temperature and the humidity.

Therefore, the image formation apparatus 1 calculates difference values (a temperature difference Td and a humidity difference Hd) between the measured temperature T and humidity H and predetermined reference values (a reference temperature Ts and a reference humidity Hs). Then, the image formation apparatus 1 determines whether the difference values exceed corresponding predetermined thresholds (a temperature threshold Tth and a humidity threshold Hth), and, when it is determined that both the difference values exceed the corresponding predetermined thresholds, calculates a resistance correction transfer voltage Vtrer.

Specifically, the image formation apparatus 1 applies a predetermined resistance variation measuring voltage Vs to the transfer roller 13 of each color from the transfer voltage generator 54, measures the value of the transfer current Itr flowing through the transfer roller 13 of each color, and determines the measured value of the transfer current Itr as a resistance variation measurement current Is. The image formation apparatus 1 also stores in advance two types of coefficients SA and SB corresponding to the combination of the temperature T and the humidity H as a coefficient table (not illustrated) in a format same as or similar to the correction table TA11 (FIG. 7) and the like. The image formation apparatus 1 reads the coefficients SA and SB corresponding to the temperature T and the humidity H, and calculates a resistance correction transfer voltage Vtrer based on the following equation (7) with the read coefficients SA and SB and the resistance variation measurement current Is.

[Equation 7]

$$Vtrrs = SB - SA \times Is \quad (7)$$

[2-8. Storage of Tables]

In this way, it may be preferable that the image formation apparatus 1 appropriately calculates the transfer voltage according to each combination of transfer conditions such as the transfer surface (first-side or second-side), the conveyance speed (standard speed or low speed), the thickness of the paper P (thin paper or thick paper), the color representing the transfer order (black (K), yellow (Y), magenta (M), or cyan (C)), and the like.

Therefore, the image formation apparatus 1 according to an embodiment includes the storage 41 (FIG. 3) that stores therein in advance, in association with information representing each combination of the transfer conditions, a voltage table such as the voltage table TV1 (FIG. 5) and a correction table such as the correction table TA11 (FIG. 7).

[3. Procedure of Transfer Voltage Determination Process]

Figure 28:
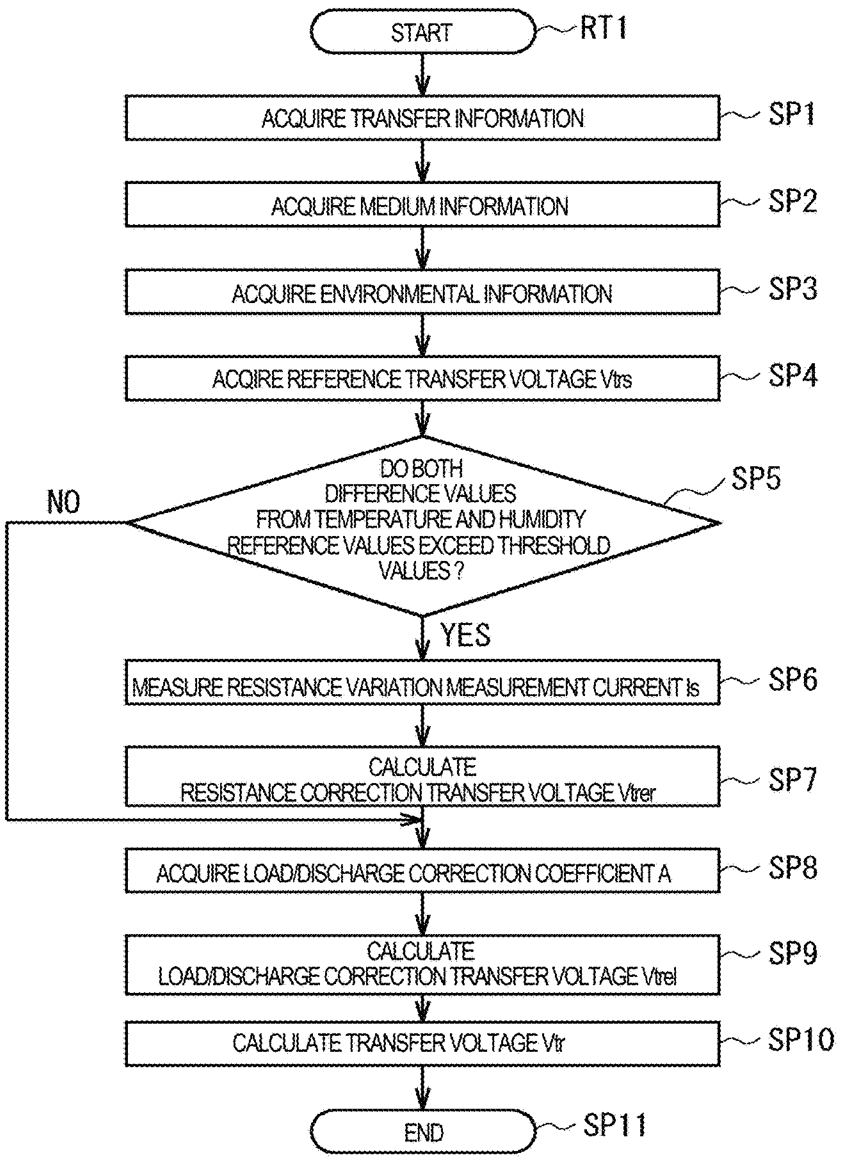
FIG. 28 is a flowchart illustrating procedures of a transfer voltage determination process.

Next, the process of determining the transfer voltage in the image formation apparatus 1 will be described in detail with reference to the flowchart of FIG. 28. When receiving a print job from the external device (not illustrated), the print controller 3 of the image formation apparatus 1 executes printing process and also executes a transfer voltage determination process. Specifically, the print controller 3 reads and executes a transfer voltage determination program stored in advance in the storage 41 to perform predetermined initialization processing and the like and also to form the functional blocks such as the information acquisition section 61 and the like (see FIG. 3) so as to start the transfer voltage determination processing procedure RT1 (FIG. 28) to start with the first step SP1.

In step SP1, the print controller 3 acquires, based on the print job received from the external device, transfer information which is information regarding the transfer processing, by the information acquisition section 61 (FIG. 3) and proceeds to the next step SP2. The transfer information is, for example, information particularly related to the transfer processing in the printing process, such as the number of colors to be transferred to the paper P (monochrome or color), the side(s) to be printed (the single-sided printing or the double-sided printing), and the like. After acquiring the transfer information based on the print job, the information acquisition section 61 stores the acquired information in the storage 41.

In step SP2, the print controller 3 acquires medium information, which is information regarding the paper P, by the information acquisition section 61 (FIG. 3), and proceeds to the next step SP3. This medium information is, for example, information regarding physical properties of the paper P due to the size, material, and the like of the paper P, such as the thickness of the paper P, the medium width W, the paper quality, the volume resistance value, the surface resistance value, and the like. The information acquisition section 61 acquires the medium information based on, for example, information included in the print job and/or setting contents set in advance by a user's operation via the display operation part 4, and stores the acquired medium information in the storage 41.

In step SP3, the print controller 3 acquires environmental information, which is information regarding the surrounding environment by the information acquisition section 61 (FIG. 3), and proceeds to the next step SP4. The environmental information is, for example, an ambient temperature and an ambient humidity. The information acquisition section 61 acquires, for example, the values detected by the temperature/humidity detector 47 (FIG. 3), and stores the detected values as the temperature T and the humidity H in the storage 41.

In step SP4, the print controller 3 acquires the reference transfer voltage Vtrs for the transfer portion 20 for each color by the voltage/coefficient acquisition section 62 (FIG. 3), and proceeds to the next step SP5. Specifically, the voltage/coefficient acquisition section 62 selects one of the tables based on the transfer conditions (the thickness of the paper P, the color representing the transfer order, the transfer surface, and the conveyance speed) based on the various information obtained in step SP1 and step SP2, and reads, from the selected table, the reference transfer voltage Vtrs that corresponds to the temperature T and humidity H obtained in step SP3.

In step SP5, the print controller 3 calculates the difference values (the temperature difference Td and the humidity difference Hd) between the measured temperature T and humidity H obtained in step SP3 and the predetermined reference values (the reference temperature Ts and the reference humidity Hs) and determines whether both of the difference values exceed the corresponding predetermined threshold values (the temperature threshold value Tth and the humidity threshold value Hth).

If a positive result is obtained in step S5, it means that the fluctuation ranges of the electrical resistance values in the transfer roller 13, the transfer belt 14, and the photosensitive drum 19 are relatively large, and thus indicates the transfer voltage Vtr needs to be corrected accordingly. When the positive result is obtained in step S5, the print controller 3 proceeds to the next step SP6.

In step SP6, the print controller 3 measures the resistance variation measurement current Is of each color (each transfer portion 20) by the transfer voltage generator 54 (FIG. 3), and proceeds to the next step SP7. Specifically, the transfer voltage generator 54 applies a predetermined resistance variation measurement voltage Vs to the transfer roller 13 of each color, measures the value of the transfer current Itr flowing through the transfer roller 13 of each color, and determines the measured value of each color as the resistance variation measurement current Is of the respective color.

In step SP7, the print controller 3 calculates the resistance correction transfer voltage Vtrer of each color (each transfer portion 20) by the arithmetic processing section 63 (FIG. 3), and proceeds to the next step SP8. Specifically, the arithmetic processing section 63 reads the coefficients SA and SB corresponding to the temperature T and the humidity H from the coefficient table (not illustrated) stored in the storage 41, calculates, in accordance with the above-described equation (7) with the coefficients SA and SB and the resistance fluctuation measurement current Is of each color, the resistance correction transfer voltage Vtrer, and stores the calculated resistance correction transfer voltage Vtrer of each color in the storage 41.

To the contrary, if a negative result is obtained in step SP5, it means that the fluctuation ranges of the electrical resistance values in the transfer roller 13, the transfer belt 14, and the photosensitive drum 19 are relatively small, and thus indicates the transfer voltage Vtr does not need to be corrected. At this time, the print controller 3 proceeds to the next step SP8 without calculating the resistance correction transfer voltage Vtrer. Note that the resistance correction transfer voltage Vtrer has a value of "0" when it is initialized for the first time.

In step SP8, the print controller 3 acquires the load/discharge correction coefficient A for the transfer portion 20 of each color by the voltage/coefficient acquisition section 62 (FIG. 3), and proceeds to the next step SP9. Specifically, the voltage/coefficient acquisition section 62 selects, based on the various information acquired in step SP1 and step SP2, the coefficient table that corresponds to the transfer conditions (the thickness of the paper P, the color representing the transfer order, the transfer surface, and the conveyance speed), and reads, from the selected coefficient table, the load/discharge correction coefficient A for the transfer portion 20 of each color that corresponds to the temperature T and humidity H acquired in step SP3.

In step SP9, the print controller 3 calculates the load/discharge correction transfer voltage Vtrel for the transfer portion 20 of each color by the arithmetic processing section 63 (FIG. 3), and proceeds to the next step SP10. Specifically, for each color, the arithmetic processing section 63 calculates the load/discharge correction transfer voltage Vtrel in accordance with the equation (3) with the medium width W acquired in step SP2 and the load/discharge correction coefficient A acquired in step SP8, and stores the calculated load/discharge correction transfer voltage Vtrel in the storage 41.

In step SP10, the print controller 3 uses the arithmetic processing section 63 (FIG. 3) to calculate the transfer voltage Vtr for the transfer portion 20 of each color by adding the resistance-correction transfer voltage Vtrer and the load/discharge-correction transfer voltage Vtrel to the reference transfer voltage Vtrs and stores the calculated transfer voltage Vtr in the storage 41. Then, the print controller 3 proceeds to the next step SP11 and ends the transfer voltage determination process RT1.

After completing the transfer voltage determination process RT1, in the printing process executed separately from the transfer voltage determination process RT1, the print controller 3 controls, upon performing the transfer processing at the transfer portion 20 of each color, the transfer voltage generator 54 via the high voltage controller 45 to apply the transfer voltage Vtr of each color to the corresponding transfer roller 13.

Here, examples of the transfer voltage Vtr calculated by the transfer voltage determination process RT1 will be described below. Note that the following examples of the transfer voltage Vtr are calculated under the condition of the temperature T of 22° C. and the humidity H of 55%.

Figure 29:
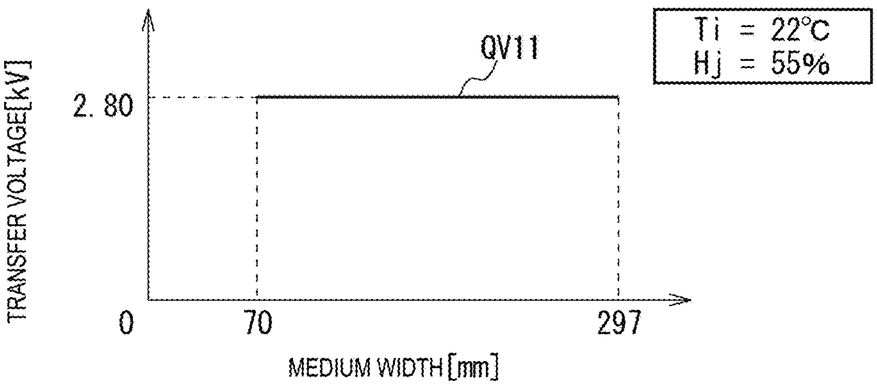
FIG. 29 is a schematic diagram illustrating a relationship between the medium width and the transfer voltage for the paper of Type 1.

The characteristic curve QV11 illustrated in FIG. 29 represents the relationship between the medium width W and the transfer voltage Vtr when the paper P is thin and low-resistance paper, that is, when the paper P is of Type 1 (FIGS. 24 and 25). In the case of the characteristic curve QV11, the value of the load/discharge correction transfer voltage Vtrel is "0" regardless of the medium width W. Therefore, the value of the transfer voltage Vtr calculated is a constant value of 2.8 kV regardless of the medium width W.

Figure 30:
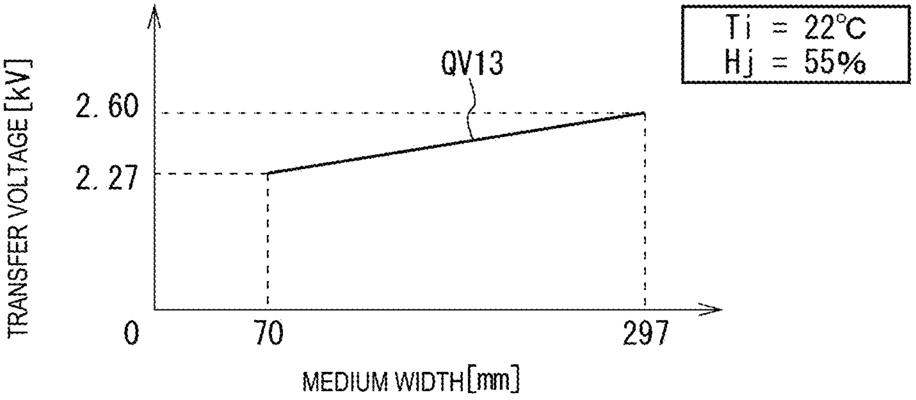
FIG. 30 is a schematic diagram illustrating a relationship between the medium width and the transfer voltage for the paper of Type 3.

Further, the characteristic curve QV13 illustrated in FIG. 30 represents the relationship between the medium width W and the transfer voltage Vtr when the paper P is thick and low-resistance paper, that is, when the paper P is of Type 3 (FIGS. 24 and 25). In the case of this characteristic curve QV13, the value of the load/discharge correction transfer voltage Vtrel increases as the medium width W increases, so the value of the transfer voltage Vtr calculated changes from 2.27 kV to 2.60 KV depending on the medium width W.

[4. Effects and the Like]

In the above-described configuration, the image formation apparatus 1 according to an embodiment is configured, upon calculating the transfer voltage Vtr, to calculate the load/discharge correction transfer voltage Vtrel for correcting the influence of the load and electric discharge caused by the gaps SC (FIG. 4) formed in the transfer portion 20 and to add the calculated load/discharge correction transfer voltage Vtrel to the reference transfer voltage Vtrs.

Upon calculating the load/discharge correction transfer voltage Vtrel, the image formation apparatus 1 is configured to read, from the correction table (the correction tables TA11 and TA21 (FIGS. 7 and 8) and the like) that corresponds to the paper thickness, the load/discharge correction coefficient A corresponding to the temperature T and humidity H, and multiplies the medium width W by the load/discharge correction coefficient A in accordance with the equation (3), so as to calculate the load/discharge correction transfer voltage Vtrel.

According to the configuration described above, the image formation apparatus 1 can calculate an appropriate value of the load/discharge correction transfer voltage Vtrel according to the temperature T, the humidity H, the paper thickness, and the medium width W. Further, by calculating the transfer voltage Vtr using the load/discharge correction transfer voltage Vtrel, the image formation apparatus 1 can significantly reduce or exclude the influence of the load and the electric discharge caused by the gaps SC in the transfer portion 20 in the transfer process. Therefore, the image formation apparatus 1 can transfer the toner image onto the paper P in a good manner. As a result, the image formation apparatus 1 can perform extremely high-quality printing regardless of the medium width W and the thickness of the paper P.

In particular, in the case where the paper P is of Type 2 or Type 3 (FIGS. 24 and 25), the image formation apparatus 1 sets the value of each load/discharge correction coefficient A in such a manner that the Type-3 transfer voltage ratio RVtr3, which is the ratio of the narrow medium transfer voltage Vtrn to the wide medium transfer voltage Vtrw for the paper P of Type 3, is smaller than the Type-2 transfer voltage ratio RVtr2, which is the ratio of the narrow medium transfer voltage Vtrn to the wide medium transfer voltage Vtrw for the paper P of Type 2. Further, the image formation apparatus 1 sets the Type-2 transfer voltage ratio RVtr2 to a value larger than one, and sets the Type-3 transfer voltage ratio RVtr3 to a value smaller than one (FIG. 27).

Accordingly, the image formation apparatus 1 can reduce the transfer voltage Vtr as the medium width increases when the paper P is Type 2, and can increase the transfer voltage Vtr as the medium width increases when the paper P is Type 3. Therefore, the image formation apparatus 1 can appropriately reduce or eliminate the influence of the load and the electric discharge caused by the gaps SC in the transfer portion 20.

Further, the image formation apparatus 1 according to an embodiment includes the storage 41 that stores therein in advance the correction table for each combination of the transfer conditions (the thickness of paper P, the color representing the transfer order, the transfer surface, and the conveyance speed). Accordingly, even if the degree of the influence of the load and the electric discharge varies due to differences in the transfer conditions, the image formation apparatus 1 can use an appropriate load/discharge correction coefficient A to calculate (obtain) an appropriate value of the load/discharge correction transfer voltage Vtrel.

From another point of view, since the image formation apparatus 1 has prepared in advance the respective correction table for each combination of the transfer conditions, the image formation apparatus 1 can obtain the optimum load/discharge correction coefficient A, simply by reading out, from the correction table corresponding to the combination of the transfer conditions, the load/discharge correction coefficient A that corresponds to the temperature T and the humidity H. In other words, the image formation apparatus 1 can reduce the processing load and the processing time, compared to a case where the load/discharge correction coefficient A according to the transfer conditions is calculated by arithmetic processing using a predetermined function or the like.

Further, similarly to the case of the load/discharge correction coefficient A, the image formation apparatus 1 stores in advance in the storage 41 the voltage table for the reference transfer voltage Vtrs that is prepared for each combination of the transfer conditions. Therefore, the image formation apparatus 1 can calculate the transfer voltage Vtr using an appropriate reference transfer voltage Vtrs regardless of the difference in the transfer conditions.

In addition, the image formation apparatus 1 is configured to calculate the resistance correction transfer voltage Vtrer according to the temperature T and the humidity H when necessary, and adds the resistance correction transfer voltage Vtrer to the reference transfer voltage Vtrs. Therefore, the image formation apparatus 1 can reduce or eliminate the influence of changes in the electrical resistance value in the transfer portion 20, and can perform a good transfer process.

According to the above configuration, the image formation apparatus 1 according to an embodiment calculate the load/discharge correction transfer voltage Vtrel by multiplying the medium width W and the load/discharge correction coefficient A read according to the transfer conditions and the like, and uses the load/discharge correction transfer voltage Vtrel to correct the influence of the load and the electric discharge caused by the gaps SC formed in the transfer portion 20, to thereby calculate the transfer voltage Vtr. In addition, the image formation apparatus 1 according to an embodiment has each load/discharge correction coefficient A set in such a manner that the Type-2 transfer voltage ratio RVtr2 is larger than the Type-3 transfer voltage ratio RVtr3. As a result, the image formation apparatus 1 can appropriately reduce or eliminate the influence of the load and the electric discharge caused by the gaps SC in the transfer portion 20, although the fluctuation of the transfer voltage Vtr with respect to the medium width W differs depending on the type of the paper P. Therefore, the image formation apparatus 1 can perform extremely high-quality printing.

[5. Other Embodiments or Modifications]

In one or more embodiments described above, the case (see FIG. 27) has been described in which the values of the load/discharge correction coefficient A in each correction table such as the correction table TA11 (FIG. 7) are set such that the transfer voltage ratio RVtr2 for Type 2 is set to be greater than one and the transfer voltage ratio RVtr3 for Type 3 is set to be less than one. However, the invention is not limited thereto. For example, the transfer voltage ratio RVtr2 for Type 2 may be set to be less than 1, and/or the transfer voltage ratio RVtr3 for Type 3 may be set to be greater than 1. In these cases, it is sufficient that at least the transfer voltage ratio RVtr2 for Type 2 is greater than the transfer voltage ratio RVtr3 for Type 3, that is, it is sufficient that the equation (6) is satisfied.

Further, in one or more embodiments described above, the case has been described in which the paper P having the volume resistivity of $1.22\times10^{17}$ Ω·cm is used as the paper P of Type 2 and the paper P having the volume resistivity of $3.41\times10^{10}$Ω·cm is used as the paper P of Type 3. However, the invention is not limited to this. For example, as the paper P of Type 2, the paper P having the volume resistivity of paper P of $1.22\times10^{17}$Ω·cm or more may be used, and as the paper P of Type 3, the paper P having the volume resistivity of $3.41\times10^{10}$Ω·cm or less may be used.

Further, in one or more embodiments described above, the case has been described in which as the paper P of Type 2, the paper P having the surface resistivity of $6.24\times10^{14}$Ω/□ is used, and as the paper P of Type 3, the paper having the surface resistivity of $4.34\times10^{10}$Ω/□ is used. However, the invention is not limited to this. For example, as the paper P of Type 2, the paper having the surface resistivity of $6.24\times10^{14}$Ω/□ or more may be used, and as the paper P of Type 3, the paper P having the surface resistivity of $4.34\times10^{10}$Ω/□ or less may be used.

Further, in one or more embodiments described above, the case has been described in which as the paper P of Type 2, the paper P having the thickness of 140 μm is used, and as the paper P of Type 3, the paper P having the thickness of 200 μm is used. However, the invention is not limited to this. For example, as the paper P of Type 2, the paper P having the thickness of 140 μm or less may be used, and as the paper P of Type 3, the paper P having the thickness of 200 μm or more may be used.

Further, in one or more embodiments described above, the case has been described in which the storage 41 stores therein in advance the tables such as the correction table TA11 (FIG. 7) and the like each of which stores therein the values of the load/discharge correction coefficient A corresponding to the values of the temperature Ti and the humidity Hj. However, the invention is not limited to this. For example, the value of the load/discharge correction coefficient A may be calculated according to the values of the temperature Ti and the humidity Hj using a predetermined function or the like. In this case, although the processing load of the arithmetic processing increases, the storage capacity of the storage 41 can be reduced, compared to the case of using the tables.

Further, in one or more embodiments described above, the case has been described in which the correction table TA11 (FIG. 7) is prepared for each combination of the transfer conditions including the thickness of the paper P, the color representing the transfer order, the transfer surface, and the conveyance speed. However, the invention is not limited to this. For example, as the transfer conditions, at least one of the thickness of the paper P, the color representing the transfer order, the transfer surface, and the conveyance speed may be omitted, or one or more other conditions may be added. The same applies to the voltage table TV1 (FIG. 5).

Further, in one or more embodiments described above, the case has been described in which the thickness of the paper P (paper thickness) is classified (divided) into two types: the thin paper and the thick paper. However, the invention is not limited to this. For example, the thickness of the paper P (paper thickness) may be classified (divided) into three or more types. The same applies to voltage tables such as voltage table TV1 (FIG. 5) and the like.

Further, in one or more embodiments described above, the case has been described in which the correction table such as the correction table TA11 (FIG. 7) is prepared for each color representing the transfer order of the respective transfer portion 20. However, the invention is not limited to this. For example, a common correction table may be used regardless of the transfer order if the value of the load/discharge correction coefficient A is not easily affected by the transfer order of the respective transfer portion 20. The same applies to the voltage tables such as the voltage table TV1 (FIG. 5).

Further, in one or more embodiments described above, the case has been described in which the correction tables such as the correction table TA11 (FIG. 7) are prepared depending on the transfer surface of the paper P (the first-side printing or the second-side printing). However, the invention is not limited to this. For example, in the case where the values of the load/discharge correction coefficient A are similar between the first side printing and the second side printing, a common correction table may be used regardless of the transfer surface (for the first-side printing or the second-side printing). Further, the paper reversing section 24 may be omitted from the image formation apparatus 1 and printing process may be performed only on one side of the paper P. In this case, the correction tables for only one side (first side) of the paper may be prepared. The same applies to the voltage tables such as the voltage table TV1 (FIG. 5) and the like.

Further, in one or more embodiments described above, the case has been described in which the conveyance speed of the paper P is classified into the two stages having the standard speed and the low speed, and the correction tables such as the correction table TA11 (FIG. 7) and the like are prepared for each of the standard and low speeds. However, the invention is not limited to this. For example, the conveyance speed of the paper P may be classified (divided) into three or more stages. Further, in a case where the value of the load/discharge correction coefficient A does not substantially change even if the conveyance speed of the paper P changes, a common correction table may be used regardless of the conveyance speed. The same applies to the voltage tables such as the voltage table TV1 (FIG. 5).

Further, in one or more embodiments described above, the case has been described in which, in steps SP5 and SP6 of the transfer voltage determination process RT1, when the difference values from the reference values exceed the threshold values in both of the temperature and the humidity, the resistance correction transfer voltage Vtrer is calculated to correct the transfer voltage Vtr. However, the invention is not limited thereto. For example, the resistance correction transfer voltage Vtrer may be calculated, when the difference value from the reference value exceeds the threshold value in at least one of the temperature and the humidity. Also, in a case where the fluctuation ranges of the resistance values, at the transfer portion 20, of the photosensitive drum 19, and the like are sufficiently small with respect to the fluctuations in the temperature T and the humidity H, the calculating of the resistance correction transfer voltage Vtrer and the adding of the resistance correction transfer voltage Vtrer to the reference transfer voltage Vtrs may be omitted.

Further, in one or more embodiments described above, the case has been described in which the four image formation units 15 are provided in the image formation apparatus 1. However, the invention is not limited thereto. For example, the image formation apparatus 1 may be provided with less than four of the image formation units 15 or more than four of the image formation units 15. Also, the image formation apparatus 1 may be provided with only one image formation unit 15 and configured as a monochrome printer. In these cases, as for the color representing the transfer order among the transfer conditions, the tables and the like may be prepared corresponding to the number of the image formation units 15.

Further, in one or more embodiments described above, the case has been described in which the image formation apparatus 1 is configured as a single-function peripheral (SFP). However, the invention is not limited thereto. For example, the image formation apparatus may be configured to perform various functions such as a multi-function peripheral having a photocopier function, a facsimile device function, and the like.

Figure 3:
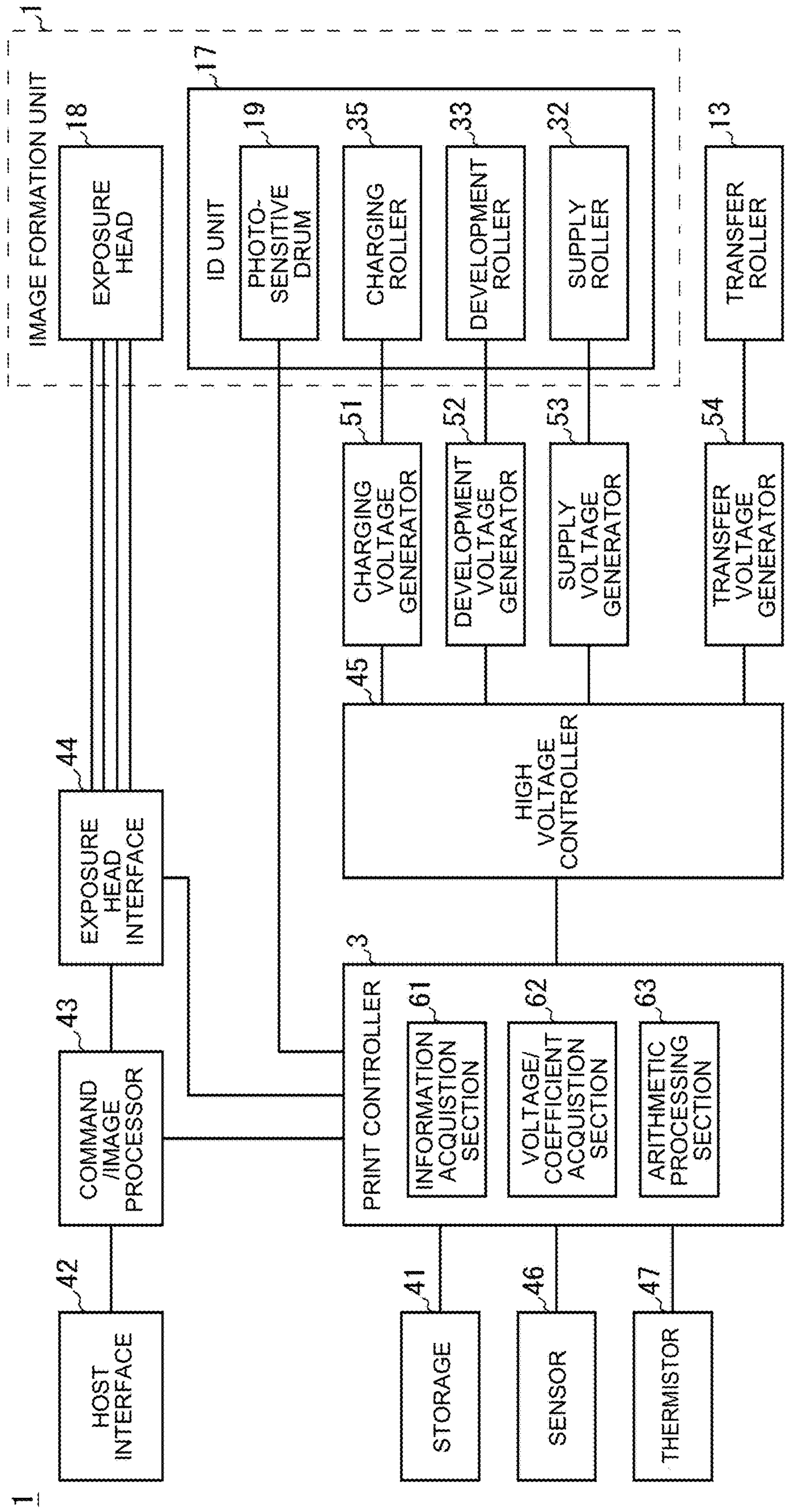
FIG. 3 is a schematic block diagram illustrating a circuit configuration of the image formation apparatus.

Further, in a first embodiment described above, the case has been described in which the functional blocks illustrated in FIG. 3 are configured by software by executing various programs in the print controller 3 of the image formation apparatus 1. However, the invention is not limited to this. For example, at least one or more of the functional blocks may be configured by hardware.

Further, in a first embodiment described above, the case has been described in which various programs are stored in advance in the storage 41 in the image formation apparatus 1. However, the invention is not limited thereto. For example, the programs may be stored in a predetermined server device (not illustrated) and downloaded from the server device through a predetermined network (not illustrated) by the host interface 42. Further, the correction tables and the voltage tables are not limited to being stored in advance in the storage 41, and may be downloaded from the server device or the like, for example.

Further, in one or more embodiments described above, the case has been described in which the image formation apparatus 1 serving as an image formation apparatus is configured including the photosensitive drum 19 serving as a photosensitive drum, the transfer belt 14 serving as a conveyor belt, the transfer rollers 13 serving as transfer members, the print controller 3, the high voltage controller 45, and the transfer voltage generator 54 collectively serving as a voltage supply device (or a voltage supplier, a voltage supply part), and the information acquisition section 61 serving as a medium information acquisition section. However, the invention is not limited to this. For example, the image formation apparatus may be configured including a photosensitive drum, a conveyor belt, a transfer member, a voltage supplier, and a medium information acquisition section at least one of which have configurations other than the above-described configurations.

Furthermore, the invention is not limited to one or more embodiments and modifications described above. That is, the application range of the invention covers embodiments obtained by arbitrarily combining some of or all of one or more embodiments and modifications described above. The scope of the invention also extends to an embodiment in which a part of the configuration in any one of one or more embodiments and modifications described above that is extracted is replaced or diverted with a part of the configuration of any one of one or more embodiments and modifications, or an embodiment in which the extracted part is added to any of one or more embodiments and modifications described above.

The invention claimed is:

1. An image formation apparatus comprising:

an image carrier configured to carry a developer image;

a conveyor belt configured to convey a medium;

a transfer member that faces the image carrier with the conveyor belt therebetween and is configured to transfer the developer image from the image carrier to the medium on the conveyor belt; and a voltage supply device configured to supply a transfer voltage to the transfer member, wherein the voltage supply device is configured to control the transfer voltage such that a first voltage ratio, which is a ratio of a first transfer voltage to a second transfer voltage, is greater than a second voltage ratio, which is a ratio of a third transfer voltage to a fourth transfer voltage, where (i) the first transfer voltage is the transfer voltage for a first medium that has a first thickness, a first resistance, and a first width, (ii) the second transfer voltage is the transfer voltage for a second medium that has the first thickness, the first resistance, and a second width larger than the first width, (iii) the third transfer voltage is the transfer voltage for a third medium that has a second thickness larger than the first thickness, a second resistance smaller than the first resistance, and the first width, and (iv) the fourth transfer voltage is the transfer voltage for a fourth medium that has the second thickness, the second resistance, and the second width.

2. The image formation apparatus according claim 1, wherein the first voltage ratio is greater than one, and the second voltage ratio is less than one.

3. The image formation apparatus according claim 1, wherein the first resistance is $1.22\times10^{17}\Omega\cdot cm$ or more when expressed by volume resistivity, and the second resistance is $3.41\times10^{10}\Omega\cdot cm$ or less when expressed by the volume resistivity.

4. The image formation apparatus according claim 1, wherein the first resistance is $6.24\times10^{14}\Omega/\square$ or more when expressed by surface resistivity, and the second resistance is $4.34\times10^{10}\Omega/\square$ or less when expressed by the surface resistivity.

5. The image formation apparatus according claim 1, wherein the first thickness is 140 μm or less, and the second thickness is 200 μm or more.

6. The image formation apparatus according claim 1, further comprising a storage that stores therein the first transfer voltage, the second transfer voltage, the third transfer voltage, and the fourth transfer voltage, or stores therein correction values or correction coefficients for determining the first transfer voltage, the second transfer voltage, the third transfer voltage, and the fourth transfer voltage.

7. The image formation apparatus according claim 1, wherein the voltage supply device is configured to change the transfer voltage depending on at least one of an ambient temperature and an ambient humidity.

8. The image formation apparatus according claim 1, wherein the voltage supply device is configured to adjust the transfer voltage to be supplied to the transfer member to a value corresponding to the thickness of the medium.

9. The image formation apparatus according claim 1, wherein the image carrier comprises a plurality of image carriers arranged along a conveyance path through which the medium is conveyed by the conveyor belt and the transfer member comprises a plurality of transfer members arranged along the conveyance path, and the voltage supply device is configured to adjust the transfer voltage to be supplied to each of the plurality of transfer members according to an arrangement order of the transfer member in the plurality of transfer members along the conveyance path.

10. The image formation apparatus according claim 1, further comprising a medium reversing section configured to flip the medium and return the flipped medium to the conveyor belt, wherein the voltage supply device is configured to adjust the transfer voltage to be supplied to the transfer member depending on which side of the medium to which the developer image is transferred.

11. The image formation apparatus according claim 1, further comprising a speed controller configured to control a conveyance speed, which is a speed at which the medium is conveyed by the conveyor belt, the voltage supply device is configured to adjust the transfer voltage to be supplied to the transfer member according to the conveyance speed.

12. An image formation method comprising:

acquiring information about a medium;

supplying a transfer voltage from a voltage supply device to a transfer member facing an image carrier that carries a developer image via a conveyor belt that conveys the medium; and transferring the developer image from the image carrier to the medium by the transfer member supplied with the transfer voltage, wherein the supplying of the transfer voltage from the voltage supply device to the transfer member comprises: controlling the transfer voltage such that a first voltage ratio, which is a ratio of a first transfer voltage to a second transfer voltage, is greater than a second voltage ratio, which is a ratio of a third transfer voltage to a fourth transfer voltage, where (i) the first transfer voltage is the transfer voltage for a first medium that has a first thickness, a first resistance, and a first width, (ii) the second transfer voltage is the transfer voltage for a second medium that has the first thickness, the first resistance, and a second width larger than the first width, (iii) the third transfer voltage is the transfer voltage for a third medium that has a second thickness larger than the first thickness, a second resistance smaller than the first resistance, and the first width, and (iv) the fourth transfer voltage is the transfer voltage for a fourth medium that has the second thickness, the second resistance, and the second width.

13. A non-transitory computer-readable storage medium that stores an image formation program, the program causing a processor to perform operations comprising:

acquiring information regarding a medium;

supplying a transfer voltage from a voltage supply device to a transfer member facing an image carrier that carries a developer image via a conveyor belt that conveys the medium; and transferring the developer image from the image carrier to the medium by the transfer member supplied with the transfer voltage, wherein the supplying of the transfer voltage from the voltage supply device to the transfer member comprises: controlling the transfer voltage such that a first voltage ratio, which is a ratio of a first transfer voltage to a second transfer voltage, is greater than a second voltage ratio, which is a ratio of a third transfer voltage to a fourth transfer voltage, where (i) the first transfer voltage is the transfer voltage for a first medium that has a first thickness, a first resistance, and a first width, (ii) the second transfer voltage is the transfer voltage for a second medium that has the first thickness, the first resistance, and a second width larger than the first width, (iii) the third transfer voltage is the transfer voltage for a third medium that has a second thickness larger than the first thickness, a second resistance smaller than the first resistance, and the first width, and (iv) the fourth transfer voltage is the transfer voltage for a fourth medium that has the second thickness, the second resistance, and the second width.

* * * * *